(12) United States Patent (10) Patent No.: US 7,665,094 B2
Frender et al. (45) Date of Patent: Feb. 16, 2010

(54) SYSTEMS AND METHODS FOR MOBILE COMMUNICATION

(75) Inventors: Kevin Blair Frender, Longmont, CO (US); Michael James McCormick, Boulder, CO (US); Krishnan Sastry, Menlo Park, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 736 days.

(21) Appl. No.: 10/733,864

(22) Filed: Dec. 11, 2003

(65) Prior Publication Data

US 2004/0163088 A1 Aug. 19, 2004

Related U.S. Application Data

(60) Provisional application No. 60/433,543, filed on Dec. 13, 2002.

(51) Int. Cl.
*G06F 3/00* (2006.01)
(52) U.S. Cl. ...................... 719/310; 715/716
(58) Field of Classification Search ................. 709/230, 709/201, 203; 719/313, 314, 315, 319, 310; 715/716
See application file for complete search history.

(56) References Cited

U.S. PATENT DOCUMENTS

| | | | |
|---|---|---|---|
| 2002/0049833 A1* | 4/2002 | Kikinis | 709/219 |
| 2002/0065879 A1* | 5/2002 | Ambrose et al. | 709/203 |
| 2002/0069263 A1 | 6/2002 | Sears et al. | |
| 2002/0129094 A1* | 9/2002 | Reisman | 709/203 |
| 2002/0147850 A1* | 10/2002 | Richards et al. | 709/248 |
| 2002/0184385 A1* | 12/2002 | Kato | 709/237 |
| 2003/0060896 A9 | 3/2003 | Hulai et al. | |
| 2003/0106022 A1 | 6/2003 | Goodacre et al. | |
| 2005/0076078 A1* | 4/2005 | Salton | 709/201 |

OTHER PUBLICATIONS

Jaworski, Jamie, "JAVA 1.1 Developer's Guide," Second Edition, Sams.net Publishing, 1997; pp. 4-10, 90-97, 934-941.*
Glass, Graham, "Web Services Building Blocks for Distributed Systems,"Prentice Hall PTR, 2002; pp. 1-24.*
Copyright Information about "Web Services Building Blocks for Distributed Systems" by Graham Glass retrieved from <http://cocatalog.loc.gov/cgi-bin/Pwebrecon.cgi> on Dec. 5, 2007.*

* cited by examiner

*Primary Examiner*—Lechi Truong
(74) *Attorney, Agent, or Firm*—Fliesler Meyer LLP

(57) ABSTRACT

A mobile communication system uses a runtime environment program which can communicate with a server. Applications are used with their own corresponding application data store. The application data store is persistent even when the applications are not running. The runtime environment program can obtain data from the server to update the application data store. The application can use the application data store. Messages can be cached at the mobile device and the server to allow for possible downtimes in the communication in the mobile unit and the server.

25 Claims, 6 Drawing Sheets

```xml
<datastore>
    <payees type="B">
        <payee name="BEA Systems" id="14"/>
        <payee name="Best Buy" id="18"/>
        <payee name="Bill's Autos" id="19"/>
    </payees>
    <payees type="hotlist">
        <payee name="Qwest" id="145"/>
        <payee name="Xcel Energy" id="218"/>
        <payee name="NOT IN LIST- search" id="-1"/>
    </payees>
    <bill id="4" status="unpaid">
        <presenter>Qwest Communications</presenter>
        <ammount bill="224.17" agreed-to-pay="0" />
        <desc>$28 for phone line
            $190 for DSL service
            $6.17 for taxes</desc>
    </bill>
    <bill id="3" status="finding-payee">
        <presenter>Bill's Autos</presenter>
        <ammount bill="987.65" agreed-to-pay="0" />
        <desc>$14.65 for new fuel pump
            $973 for labor</desc>
    </bill>
    <bill id="2" status="agreed-to-pay">
        <presenter>XCel Energy</presenter>
        <ammount bill="67.54" agreed-to-pay="67.54" />
        <payee id="218" />
        <desc>$60 electric
            $7.54 gas</desc>
    </bill>
    <bill id="1" status="paid">
        <presenter>Qwest Communications</presenter>
        <ammount bill="224.17" agreed-to-pay="224.17" />
        <payee id="145" />
        <desc>$28 for phone line
            190 for DSL service
            $6.17 for taxes</desc>
    </bill>
/datastore>
```

FIG. 4D

SYSTEMS AND METHODS FOR MOBILE COMMUNICATION

FIELD OF THE INVENTION

The present invention relates to communications with mobile devices.

BACKGROUND OF THE INVENTION

With the growing popularity of mobile devices, communication systems using the mobile devices have become increasingly popular. One example is the use of web-browsers on a mobile device. One example is the Wireless Application Protocol (WAP) Applications written in the Wireless Markup Language (WML), which is a subset of the extensible markup language (XML). WAP enables access to internet information with a mobile device.

Other wireless protocols for use with mobile devices in a browser type environment have also been proposed.

BRIEF DESCRIPTION OF THE DRAWINGS

FIGS. 4A-4D illustrates a view of bill paying application of one embodiment of the present invention.

DETAILED DESCRIPTION

Figure 1:
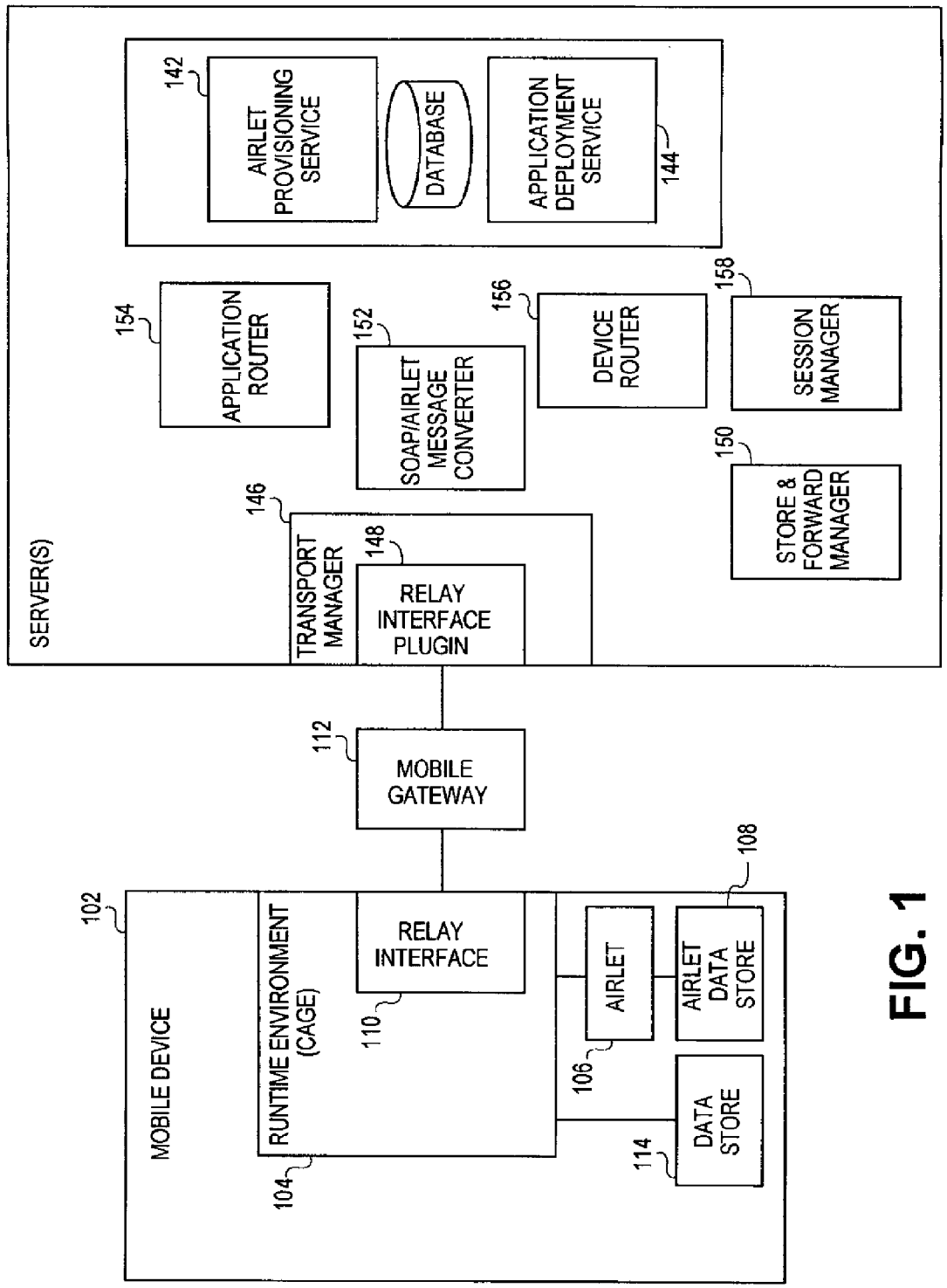
FIG. 1 is a functional diagram of a mobile device and a server of one embodiment of the present invention.

FIG. 1 is an example of a system of one embodiment of the present invention.

FIG. 1 includes a mobile device 102. The mobile device 102 can be a cell phone, a personal digital assistant (PDA), a portable computer, laptop and any other possible mobile device. In the FIG. 1 example, the mobile device includes a runtime environment program 104. The runtime environment program 104 can be executed on a processor of the mobile device 102. The runtime environment program 104 is used to run applications, such as application 106. In one embodiment, the application contains presentation information; information for interpreting stored application data, such as the data stored in the application store 108; and information for constructing messages to a server. This information can be stored in templates used to construct web pages. The runtime environment program 104 can use the information in the application to produce a display, such as a page display, that includes some of the stored application data. The runtime environment program can interact with the server 140 to update the stored application data in the application store 108 in the background when a connection between mobile device 102 and the server 110 is available.

The application data in the application data store 108 is persistent, even when the application in not running. The server 140 can update the application data store 108 in the background whenever there is a connection between the server 140 and mobile device 102. Messages from the mobile device 102 to the server 140 can be queued when the connection is not available, and similar messages from the server 140 to the mobile device 102 can also be queued when such a connection is not available.

In one embodiment, the application 106 includes templates to construct pages for display. The stored application data from application data store 108 can be used to fill out the template to produce the display pages. In one case, the runtime environment 104 constructs pages using the template and the stored data. For example, in a bill paying application, a template for "Bills to be Paid", could have title info, layout or other user interface information in the template and an indication of how to obtain the data from the application data store 108 for the bills to be paid, as well as presentation information for displaying such data within the page. For example, XML tags for "bills to be paid" data can be indicated within the template of the application 106. The runtime environment 104 then can check the XML data in the application data 108 to determine the bills to be paid. Once the application 106 on the mobile device 102 is registered with the server 140, information about additional bills to be paid can be sent from the server 140 when a connection is available and then stored in the application data store. Thus, the application does not rely on a connection while the application is running. The information concerning the bills to be paid can be sent in the background when a connection is available.

In one embodiment, the application 106 is written in a markup language. The markup language can include Xscript elements to access data. Xscript is a known extension of ECMAscript, an international Web standard for scripting languages in a host environment. The markup language can also use HTML tags, including extensions such as XHTML mobile tags, for the page layout.

The mobile device 102 can include multiple applications, each with its own application data store in the memory. One embodiment, the runtime environment program 104 can search for additional applications. These additional applications can be stored in the server 140. The application provisioning service 142 can be an application registry that indicates available applications. The runtime environment program 104 can provide authentication information before downloading the additional application. For example, the server 140 may require the mobile device to provide some authorization code, such as a download authorization criteria (DAC), before being allowed to download an application. If the authorization is accepted by the server 140, additional applications can be downloaded. These applications can be sent in an application envelope. In one embodiment, the application 106 receives data from a web service. The web service can be provided by the application deployment service 144.

The runtime environment program 104 can send simplified messages to the server 140. By simplifying the messages, the logic at the mobile device 102 can be reduced. In one embodiment, the server 140 convert simplified messages into Simple Object Access Protocol (SOAP) messages for a web service and converts SOAP messages from the web service into simplified messages for the mobile device. In a preferred embodiment, both the web service and the applications use messages that are sub-sets of SOAP and the conversion between the simplified messages and SOAP message is relativity easy. In one embodiment, each simplified message includes a title and a single XML field. The XML field can contain an XML document or XML fragment.

In one embodiment, the runtime environment 104 abstracts details of the mobile device from the application. This means that each application can be run on different mobile devices while having the runtime environment program deal with the specific details of the mobile device. Such details include the lower level message transfer protocols. For example, different cell phones may use different messaging systems. In the example of FIG. 1, the runtime environment 104 includes a relay interface 110, which knows the transportation protocol used by the mobile device 102. Messages can be sent across the mobile gateway 112, which is the normal mobile gateway for the mobile device 102. At the server 140, a transport manager 146 can include a plugin, which understands the lower level protocols used by the mobile device 102. In this example, relay interface plugin 148 is used. Additional plugins can be used for different types of mobile devices with different lower level protocols. The applications 106 are written at a high level and the message do not depend upon the type of lower level protocol used.

Server 140 also includes a Store and Forward Manager 150. The Store and Forward Manager 150 can store messages from the server until a connection is available from the server 142 to the mobile device 102.

A SOAP message converter 152 can convert the messages from the simplified messages from the mobile devices 102 into the SOAP messages for the web service in the application deployment service 144. The web service router 154 sends the message to the correct web service. The device router 165 is used to direct the messages from the server 140 to the correct mobile device. Session manager 158 keeps track of an all open sessions for communication between the mobile device and web services in the application deployment service 144. The application provisioning service 142, application deployment service 144 and other elements can be part of a commercially available web service system. For example, the Weblogic server (WLS) available from Bea Systems can be used.

The mobile device 102 can also include a another data store 114 that can store information used by the runtime environment program 104. For example, the data store 114 can store a list of available applications from server 140.

Figure 2:
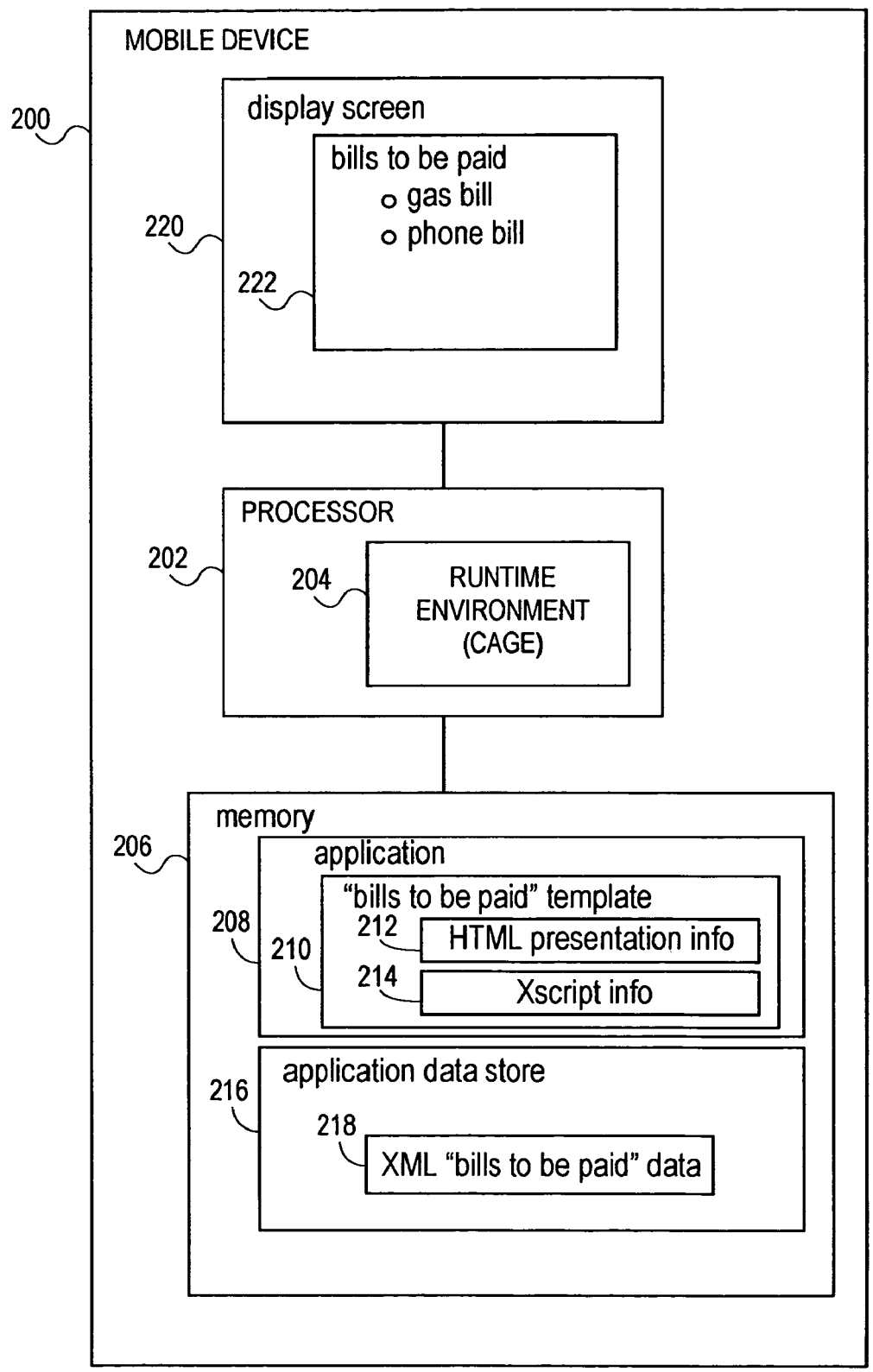
FIG. 2 is a diagram of a mobile device of one embodiment of the present invention.

FIG. 2 illustrates a mobile device 200 that includes a processor 202 which executes the runtime environment program 204. In this embodiment, the memory 206 stores the application 208. In this example, the application 208 includes a number templates for producing displayed pages. One example of a template is the "Bills to be Paid" template 210. The "Bills to be Paid" template includes HTML presentation info 212 and Xscript info 214. The HTML presentation information can include information for layout, font size, title names and the like. The Xscript info 214 is information that allows the runtime environment 204 to access the application data store 216. In this case, the application data store 216 includes XML "bills to be paid" data 218. In one embodiment, the Xscript info 214 indicates the information in the XML data to be obtained from the application data store 216. Additionally, the Xscript info can include calculations such as a calculation of a future balance based on the current balance minus the bill to be paid amount. Such a calculations can be used for balance checking or for providing a display of the future balance to the user of the mobile device 200. A display screen 220 connected to the processor 202 can be used to provide a display page 222. In this example, a "bill to be paid" page is displayed. In this example, a gas bill and a phone bill are indicated as bills to be paid. User input can be used then to select the gas bill or the phone bill page to be constructed and displayed. For example, if the gas bill is displayed an "individual bill" template within the application 208 is used to create the new page.

Figure 3:
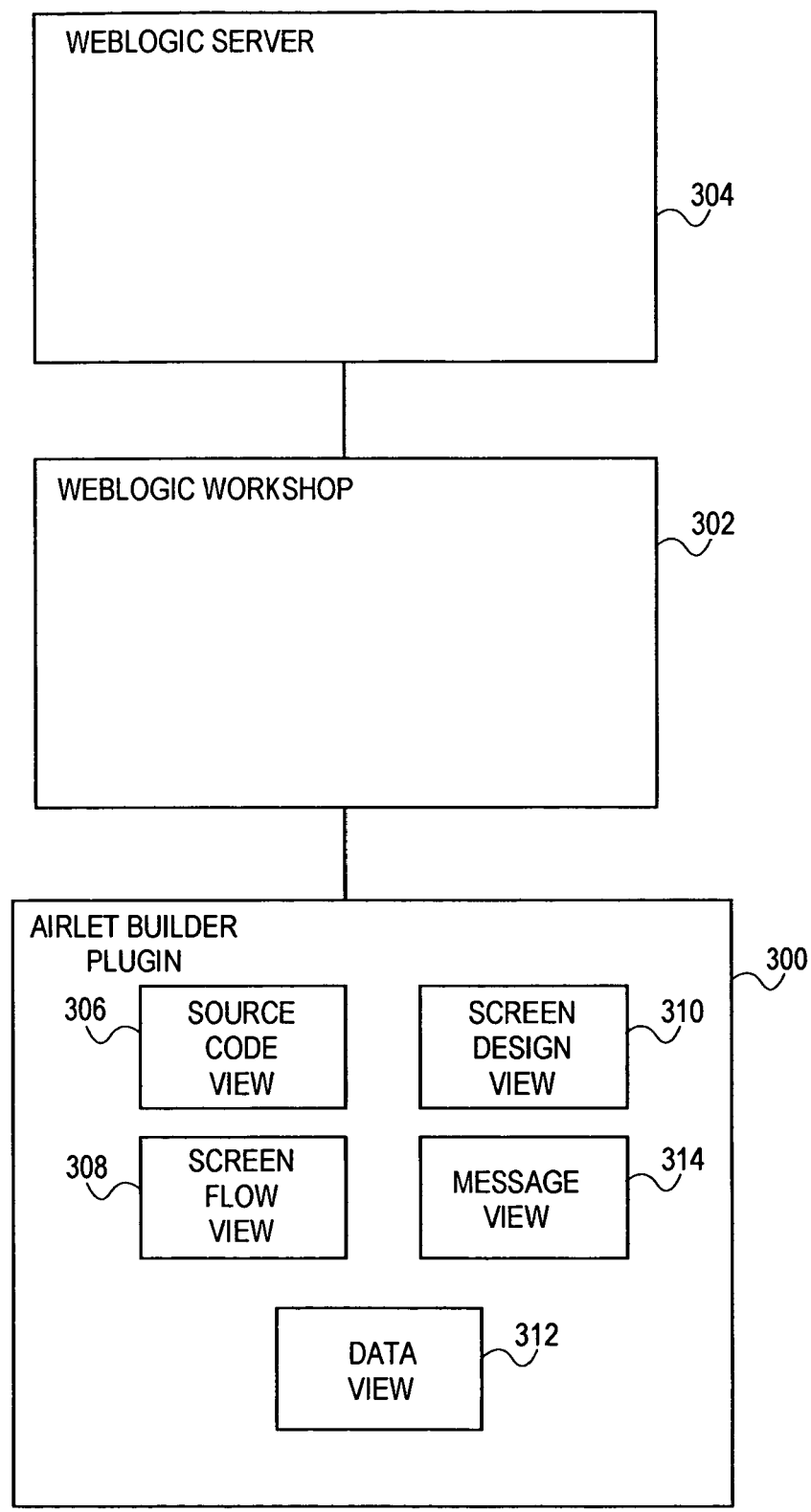
FIG. 3 is a diagram illustrating an application builder of one embodiment of the present invention.

FIG. 3 illustrates the use of the application builder. In the environment of FIG. 3, an application builder plugin 300 is used to plug on to an integrated design environment (IDE) 302 such as Weblogic Workshop (WLW) available from Bea Systems, Inc. The application builder plugin 300 and WLW 302 can be used to produce components that can be run using an application server 304 on such as the Weblogic Server (WLS) available from Bea Systems, Inc. The application builder plugin 300, is a graphical way to construct applications and web service that interact with applications. In example of FIG. 3, the application plugin 300 is used to construct applications. In this example, source code view 306 illustrates the source code of the application. The screen flow view 308 is used to indicate connections between pages. Once the screen view is produced, the application builder plugin can automatically produce the code necessary for the links between the pages. Each page can be associated with a template, which can be designed in the screen design view 310. When links are produced between the pages in the screen flow view 308, these links can be automatically added into the templates for each of the pages. Screen design view 310 can be used to adjust the presentation and the scripts for setting data from the data store. The screen design can show a graphical display of an example of a page, as well as fields for the HTML and Xscript to be used. Test data can be accessed with the data view 312. The message view 314 illustrates the messages that sent between the application and the web service.

The web service can already exist and the application used to mobilize a web service. The new web service can be developed can be developed later or at the same time as an application. The message view 314 can be used in IDE 302 to produce a corresponding web service using web service design tools of the IDE 302.

Figure 4A:
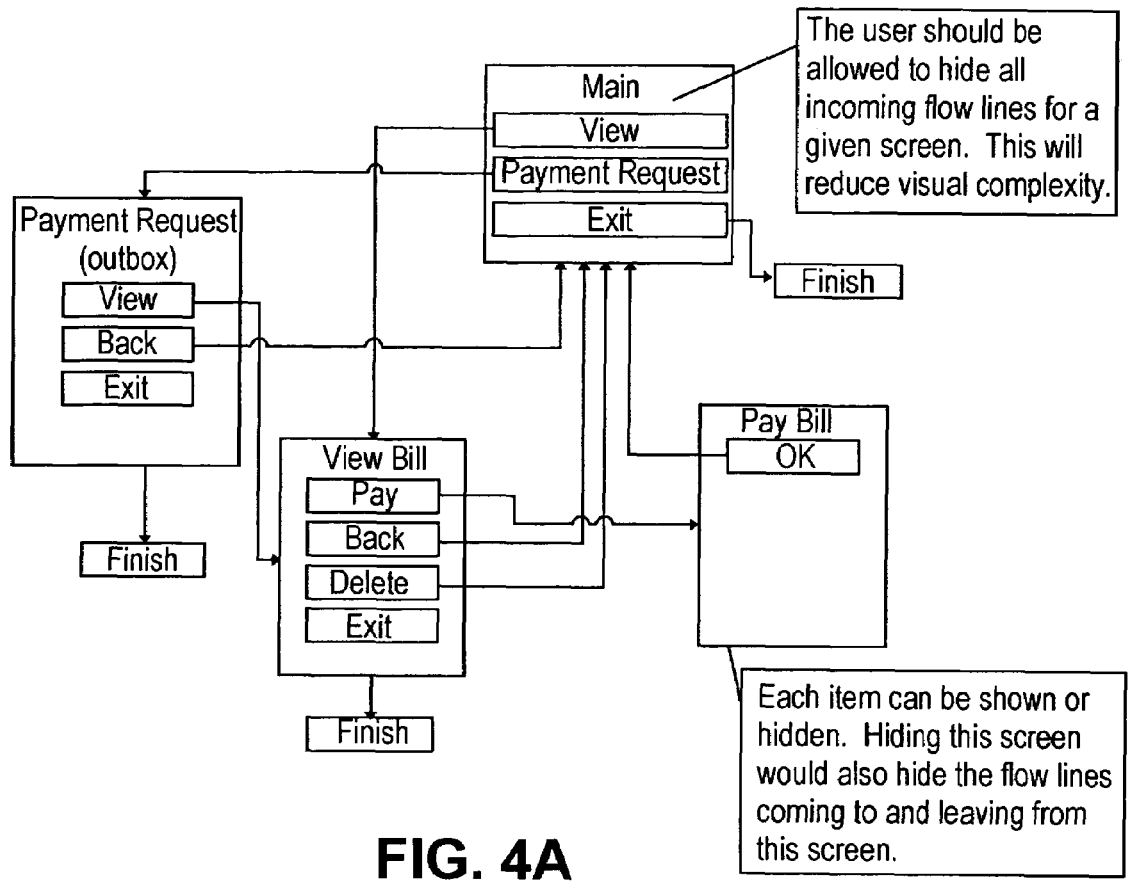
Figure 4B:
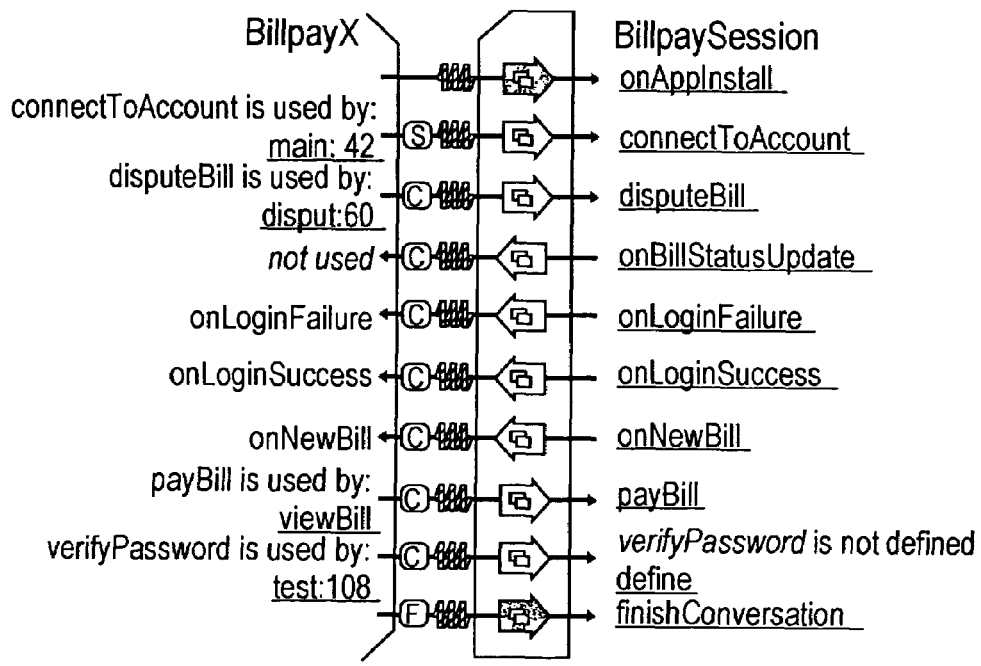
Figure 4C:
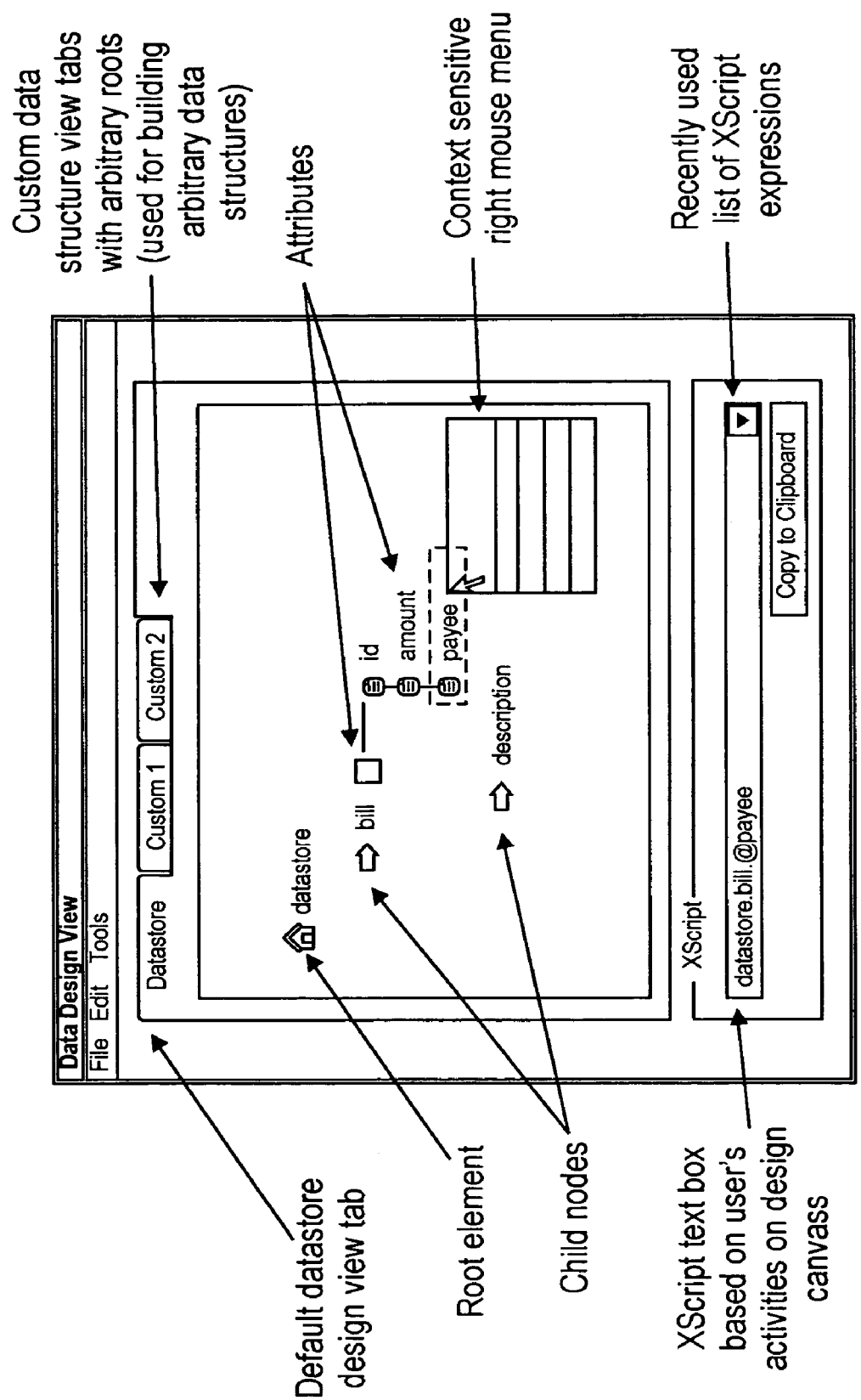

FIG. 4A illustrates an example of a page flow view that illustrates the connections between pages. The application builder can have a graphical display and then automatically produce information for the templates corresponding to the pages, such that the pages can be constructed using the application data store in the mobile device. FIG. 4B illustrates an example of a message screen. Similar message screens are used in Weblogic Workshop. FIG. 4C illustrates a data design view that illustrates the use of Xscript text. FIG. 4B illustrates an example of data store constructed out of XML. The highlighted sections show the results of a Xscript search. In this case, a Xscript search for bills to Quest Communications. The result of the Xscript search can then be added in a page. For example, a page that illustrates all the bills due, to a single company, such as Quest Communications.

Airlet Embodiment

In one embodiment, the applications are airlets and the runtime environment program is a Client Application Generation Engine (CAGE). Details of this embodiment are described below.

Airlets are collections of user interfaces pages linked to locally persisted data and capable of receiving an sending messages asynchronously from the action of the user. Airlets are written in the "AirML" language.

Airlets can provide dynamic access to data stored locally on a device. Through messages exchanged with a server, the airlet is able to update its local data store and trigger actions on the server. Messages are sent and received asynchronously with respect to the airlet, so that the airlet is never forced to wait for a server response. Because all user interface pages are generated dynamically by the client, airlets can be used even when network connectivity is poor or unavailable.

Airlets reside in a "CAGE" environment on the device, which provides the airlets with a high-level abstraction of the services available on the device.

At the highest level, airlets consist of a collection of "screens" containing the user interface information and "message handlers" which process messages received from the server or other entitles. Each screen definition describes a set of user interface "widgets" for displaying data and "commands" that the user may execute from the screen. Widget descriptions include information on how data should be bound to them from the local data store, while command definitions detail what action should be taken in the command is chosen. The message handlers contain information on how to deal with messages arriving from the server of other entities, such as adding data from the message to the local data store or responding with another message.

The local data store is accessed by the airlet as a hierarchical, ordered object database abstracted in the form of an XML document. The data store is not necessarily physically stored as an XML document, but treating is as such provides a familiar, powerful and flexible mechanism for storing data while maintaining a relatively lightweight footprint. The CAGE is responsible for providing this abstraction top of the actual data storage mechanism available on the device.

All communication to and from the airlet is conducted through a "message" abstraction. Each message consists of an "action", which serves as a label to indicate the message type or intent, and optionally some "action data", which may contain arbitrary data. Action data is a hierarchical, ordered object database fragment and is accessible to the airlet through an XML document fragment abstraction, although the data is not necessarily physically transmitted as XML. Data arriving from a server or other entities (such as other airlets or applications) is presented to the appropriate airlet message handler as an construction or derive and XML fragment and specify that it be sent. The CAGE is responsible for handling all the underlying details involved in receiving and sending messages, such as data formatting, network or inter-application protocols and error handling.

Airlet creation is vastly simplified by building on the supporting CAGE framework, which provides powerful yet familiar and straightforward mechanisms for accomplishing complex tasks.

In one embodiment, airlets come in two types: furry and anonymous. Anonymous airlet communication is asynchronous on the device. The airlet and user are not required to wait for the message to be sent to the server. The CAGE posts messages on behalf of anonymous airlets synchronously with the server. Server response to the synchronous post are collected by the CAGE and passed as messages to the airlet. This form of airlet is able to be autonomous from the server while running, but the server is severely limited in its ability to act independently of the airlet because all communication with the server is synchronous. The server is also incapable of sending any messages for the airlet which where not explicitly requested.

Despite the limitations of anonymous airlets, they may be useful in cases where the server does not need to autonomously push information the airlet of where little or not additional server infrastructure is desirable.

Airlets not requiring any interaction with any entity external to the CAGE are considered degenerate cases of anonymous airlets.

Furry airlets' communication can be fully asynchronous in both directions, allowing complete autonomy for both the airlet and the server. Both the airlet and server are able to initiate actions and push messages without synchronous solicitation.

Such airlets are "activated" with a server to initiate an ongoing, intermittent and asynchronous exchange of messages, referred to as an "incarnation". Messages for an incarnation are sent over communication "relays", which may vary in functionality depending on the features supported by the device and network. Some such relays may not support true bi-directional push of massages, but the server is still allowed to act independently; dispatched messages may be enqueued until the relay can deliver them.

In some cases, airlets may not need to communicate with a server to exchange messages, but may still benefit from being incarnated. This allows the server to inform the CAGE of airlet upgrades as they become available, and may provide the airlet with the ability to communicate with other entities (airlets or other applications) local to the device.

Terms are defined here for one embodiment:

Activation URL: Some airlets are "activated" with an "Activation server" to initialize the ongoing asynchronous communications ("incarnation") with a home server. The "Activation URL" is the URL through which a furry airlet is activated by the CAGE.

Airlet: A collection of "smart pages" which, once downloaded to a device, can provide dynamic access to content stored locally on the device, updating the content through CAGE-mediated communication with a server, which is asynchronous to the airlet. Airlets are written in the AirML language and are run in the "CAGE" environment of the client device.

Airlet Envelope: An airlet "envelope" is the transmission format for an airlet, which contains the airlet description and all metadata required to run the airlet in a CAGE. Airlets may be made available pre-packaged in envelopes, or the envelopes may be obtained through a negotiated download process.

Airlet URI: In order to distinguish airlet "types" independent of versions or instance, airlets have an associated URI (Uniformed Resources Identifier). The airlet URI distinguishes an airlet from others even as new versions of the airlet become available, similar to the way a car's model name distinguishes the model even as new versions are released. When another airlet or application on the device wishes to communicate with a particular airlet, it identifies the airlet it wishes to talk to through the airlet URI. Additionally, the URIs are used by the CAGE to correlate versions of "the same airlet" when upgrading. Because airlet URIs are used by the CAGE and other entities to uniquely identify an airlet type, they should have the characteristics of persistence and uniqueness. Airlet URIs may be the same as the URL used to download the airlet or may be used only for identification.

AirML: The markup language used to specify airlets.

CAGE: The CAGE is the runtime environment responsible for devices abstraction for the airlets. It is responsible for handling any device-specific functionality on behalf of the airlets, such as provisioning, airlet management, network communication, user interface display, persistent storage management and running the airlet.

Compatibility Code: In order for the CASE to more gracefully handle airlet upgrading; a "compatibility code" is introduced which encodes information about airlet version compatibility. The compatibility code is broken into "incompatible revision index" (IRI) and "compatible revision index" (CRI) components, which are represented as integer numbers. If a new airlet version includes only changes which are completely backward-compatible with the previous version, it keeps the same IRI as the previous version but increments its CRI. When changes are introduced which are not backward compatible, the IRI is incremented. Through the compatibility code, the CAGE is capable of determining when a new version of an airlet will be backward compatible with the existing version. In addition, the compatibility code allows the CAGE to determine whether an airlet version is newer of older than the airlet version it currently has.

Data Store: The data on the device for an airlet is referred to as the "client data store", or simply "data store". The data store is persistent even when the airlet is not running. Airlets can access and manipulate data in the client data sore when they are running, and can control how new data communicated from the server is incorporated into the client data store.

Device: The physical device being used to run the airlets in a CAGE. This may be (but is not limited to) a cell phone, PDA or personal computer.

Home Server: Each airlet has a "home server", which is the server that the airlet communicates with. Furry airlets only communicate with the home server after activation.

Incarnation: "Incarnation" refers to the long-running but intermittent and asynchronous exchange of data between a furry airlet and its home server. The term also applies to the entire body of communications between the airlet and server between activation and deactivation.

Relay: After activation for furry airlets, all further communication between an airlet and server is done through a "relay" protocol. Relay protocols may support various features, such as guaranteed messaging, security, true asynchronous "push" of messages, use of intermediary proxy servers, etc.

The following are benefits of the design of the AirML language (and subsequently, the supporting CAGE "browser" environment).

Simplicity of Development: Airlets written in the AirML language are easy to develop, with a minimal portable set of functionality. Unique and complex features are avoided wherever possible if they are not required. Any required complete functionality can be handled by the CAGE whenever possible to make developing airlets easier. Familiar and intuitive concepts, languages and operators should are used whenever possible.

Lightweight Language: The AirML language is simple to interpret and/or compile, allowing for a compact CAGE implementation. AirML provides a small but powerful description of an airlet, so that airlet descriptions can be downloaded quickly and cheaply, as well as requiring less storage space on the device.

Independent Execution: The AirML language enables client airlets to provide meaningful functionality whether or not they are connected to the network. Airlets are semi-autonomous in that they can browse and manipulate data without relying on synchronous communication with the server. All airlet-sever communication is designed and assumed to be asynchronous; higher-quality network connections will only enhance the user's experience with the airlet.

Extensibility: The AirML language and CAGE runtime environment allow extensibility, so that the vendors can leverage platform strengths and features on top of the portable base functionality.

Security: The security of each airlet's data and communications is of utmost importance. Native application and airlets explicitly "serve up" data to be shared with other airlets or native applications of the device, so that no airlet or application data is accessible by other parties without explicity consent and knowledge. The CAGE environment can detect and prevent malicious behavior by airlets by enforcing any restrictions or performing checks to ensure the proper behavior of the airlet. The very high-level AirML language allows for easier detection and prevention of insecure or malevolent airlet actions.

Interoperability with other Airlets and Applications: Airlets can communicate with other airlets and application on a device to enhance functionality, within reasonable security constraints. The AirML language provides simple, intuitive constructs and abstractions for performing inter-airlet and inter-application communication.

User Interface Separated from Data: Unlike HTML, where data and markup are intertwined, the AirML language is separated from the data so that new data can be received from the server without having to send new AirML markup. Once the airlets is downloaded, communication between the client and server can omit UI markup, potentially making messages much smaller and faster, or allowing larger amounts of data to be sent.

Dynamic Airlet Provisioning: Once the CAGE environment is loaded onto a user's device, it should be possible for new airlets to be downloaded dynamically over any network (land-line or wireless) as supported by the CAGE implementation.

Loose Coupling: The AirML language should enables airlets to minimize dependencies on the data formats used in communications between an airlet, its server, other airlets and other applications. Data can be extracted from these communications without knowing the exact structure of the data, so that minor changes in the data format do not disable the airlet.

Minimal New Infrastructure: The simplest airlets require only minimal new infrastructure to run on the device, and little or no additional server infrastructure.

Airlet Lifecycle

This section describes the lifecycle of an airlet being used within a CAGE environment. The lifecycle consists of several steps: discovery, acquisition, activation, normal use and removal. In addition, during normal use, the airlet may be upgraded or re-activated as necessary.

Discovery

Discovery of airlets may happen through a variety of mechanisms. The device's browser (e.g. WAP or I-mode) may be used to find links to download an airlet, and (if the browser and CAGE implementation support it) may launch the CAGE directly. The user may directly receive the airlet or URL to download an airlet from a source such as an e-mail or carrier-supported push. Through whatever mechanism, an airlet envelope, registry, or URL from which an envelope or registry my be obtained is passed or entered into the CAGE.

Acquisition

During the acquisition phase of an airlet lifecycle, the CAGE obtains an airlet envelope containing the airlet description and associated metadata. The airlet envelope may be obtained directly or through a negotiated download process. CAGE implementations are strongly recommended to support both acquisition forms, but supporting either is sufficient for a compliant CAGE implementations. Airlets are not required to be made available through both forms of acquisition, as some airlets may need the controlled access that only the negotiated download process provides.

If the CAGE has obtained an airlet envelope directly through the discovery process, the acquisition portion of the airlet lifecycle is complete.

When the discovery process yields an airlet registry, the negotiated download process should commence as described in detail below:

If the result of the airlet discovery process is a URL, the CAGE should retrieve the contents of the URL and examine the MIME type of the results. The table below details how to proceed:

Interpreting URL Retrieval MIME Types

| MIME Type | Implied Content Type | Appropriate Acquisition Action |
|---|---|---|
| Application/x-airlet | Airlet envelope | Airlet acquisition is complete |
| Application/x-airlet-registry | Airlet registry | The negotiated download process should commence. |
| (other) | (unknown) | An error message may be displayed, or the content passed to an appropriate handler. |

Airlet Envelope

Airlet envelope contained a binary representation of the airlet as pre-parsed "bytecode" and additional metadata.

Negotiated Download

The negotiated download process helps the CAGE to ensure that it can handle an airlet before downloading the full airlet description and permits the server to control access to the airlet.

The negotiated download process may be handled by the CAGE directly or through a special "downloading airlet", which may be generic or a special implementation for a particular CAGE implementation, network carrier, or any other entity. Placing the downloading logic in a special "downloading airlet" enables customizedable and more easily upgradeable downloading behavior, but requires specific CAGE extensions and security concessions for the downloading airlet.

The negotiated download in a two-step process; a "registry" is obtained first to ensure that the airlet will function properly in the CAGE, after which the actual airlet envelope may be downloaded. The registry contains basic airlet information and instructions on how to download the airlet. In the second step the CAGE requests the actual airlet envelope from the location specified in the registry.

Obtaining a Registry

For airlets available through a negotiated download, the server must provide access to airlet registries through a standard HTTP or HTTPS "GET" operation. The server and CAGE are allowed to retrieve registries through other mechanisms (such as email or as part of an upgrade process) but this functionality is not required.

The MIME type for airlet registries must be "application/x-airlet-registry".

Registry Details

The airlet registry is encoded as an XML document with a standard structure and contains:

The airlet URI, which is an identifier unique to the airlet "type".
The version of the airlet.
The compatibility code for the airlet
The airlet specification version the airlet was written to. This is currently "0".
An Optional airlet vendor specification.
An optional "request key" used by the server to correlate the download with subsequent activations.
The size of the airlet envelope.
An optional brief description of the airlet.
An optional set of "download authorization criteria" ("DAC"), which are simple values to be collected from the user in order to authorize download of the airlet. These are discussed in detail later.

The URL to post the download request to.

Sample airlet registry

```
<airlet uri=http://apps.acmebank.com/billpay version="1.1.03"
    cc="1.5 sv= "0" vendor="ACME Banking System, Inc."
    rkey=5225783">
    <size env="1834"/>
    <desc>
        ACMEBank&apos;s mobile bill payment service
    </desc>
    <dac name="fname">First name</dac>
    <dac name="season">Favorite season</dac>
    <dac name="phone".req= "n" >Phone number</dac>
    <post url= http://download. acmebank.com/billpay/>
</airlet>
```

DTD for the airlet registry

```
<?xml version='1.0' encoding='UTF-8 ?>
<!ELEMENT airlet (size, desc?, dac*, post)>
<!ATTLIST airlet
    uri         CDATA #REQUIRED
    version     CDATA #REQUIRED
    cc          CDATA #REQUIRED
    sv          CDATA #REQUIRED
    vendor      CDATA #IMPLIED
    rkey        CDATA #IMPLIED
>
<! ELEMENT size EMPTY>
<!ATTLIST size
    env         CDATA #REQUIRED
>
<!ELEMENT desc (#PCDATA)>
<!ELEMENT dac (#PCDATAT)>
<!--The parsed character data of the dac element is the text
to be -->
<!-- shown to the user when they are entering the download
authorization -->
<!--criteria value.-->
<!ATTLIST dac
    name        CDATA #REQUIRED
    req         (y|n) "y"
>
<!ELEMENT post EMPTY>
<!ATTLIST post
    url         CDATA #REQUIRED
    opt         CDATA #IMPLIED
```

The "airlet" element's "uri" attribute is the "airlet URI", which serves to uniquely identify the airlet's "type" independent of versioning or instance information. The airlet URI distinguishes an airlet from others even as new versions of the airlet become available, similar to the way a car's model name distinguishes the mode even as new versions are released. Because this URI is used by the CAGE and other entities to uniquely identify an airlet from communication and upgrade functionally, it should have the characteristics of persistence and uniqueness. In these respects, the airlet URI is logically equivalent to the infrequently utilized URN [RFC2141], but the same effect can be created by carefully managing the URI. The airlet URI may or may not be the same as the URL used to download the airlet, but the URI specified in the "uri" attribute of the airlet registry serves as an identifier only.

The "version" attribute of the "airlet" element specifies the compatibility code for the airlet, which encodes compatibility information about the airlet, as specified in the "Airlet Lifecycle" subsection "upgrades" subsection "Compatibility Codes".

The "airlet" element's "sv" attribute identifies the airlet specification version the airlet was written to. New versions of the airlet specification may be incompatible with an earlier version; the "sv" attribute can allow the CAGE to identify airlets with which it is not compatible before downloading them.

The "vendor" attribute is optional, and specifies the creator of the airlet.

The optional "rkey" attribute allows specification of a "request key" which may be specified by the server to enable correlation of the download request with subsequent upgrade and activation requests by the CAGE.

The "size" element is used to specify the size of the airlet envelope as it would be downloaded by the CAGE. The "env" attribute specifies the size (in bytes) of the airlet envelope. The CAGE can use the size information to determine if the airlet being examined would fit on the device.

The "desc" element is optional, and contains a textual description of the airlet intended for presentation to the user.

A list of zero or more "dac" elements may be used to specify download authorization criteria (DAC), which are discussed in detail below. In the airlet registry, each DAC consists of a name (in the "name" attribute) and a textual description (the body of the "dac" element). Only the textual description should be shown to the user; the DAC's name is used only for correlation purposes by the server. The "dac" element's optional "req" attribute indicates whether the DAC value is required; the default if not specified is that the DAC is required.

The "post" element contains the URL the CAGE can post the download request to in order to obtain the airlet envelope, as described in detail in a subsequent section. The URL may be either HTTP or HTTPS at the server's or airlet creator's discretion. The "post" element allows the specification of up to two URLs for downloading. The primary URL is specified in the "url" attribute, and the secondary URL (if any) is specified in the optional "opt" attribute. The CAGE must download from the primary URL if it supports the protocol in the primary URL. If the CAGE does not support the protocol for the primary URL, it may download the airlet using the secondary URL if one is specified. This allows the server to specify both a "desired" and "acceptable" downloading mechanism. If HTTPS is the desired protocol for posting the download request and the subsequent downloading of the airlet, the URL specified in the "url" attribute should be an HTTPS URL. If HTTP is an acceptable alternative to HTTPS, the "url" attribute should be the HTTPS URL and the "opt" attribute should contain the HTTP URL. If only one method of downloading is supported or acceptable to the server (either HTTP or HTTPS) then only that URL should be specified, in the "url" attribute.

The URL(s) provided in the "post" element of the registry do not need to be on the same machine as the registry was retrieved from, nor do they need to be the same machine as the activation URL, which is discussed later.

Download Authorization Criteria

The airlet registry can optionally contain a list of "download authorization criteria" (DAC), which are values to be collected from the user and sent along with the download request. This can be useful for maintaining access control to airlets, or collecting information about users, as is often done through web pages currently.

Individual DACs may be either optional or required. The CAGE is responsible for presenting the text descriptions for each DAC specified to the user, and allowing them to enter an arbitrary text value in response. The CAGE should indicate to the user, which value the user is required to enter and which are optional. Once the user has entered values for the DACs, the CAGE must include them in its download request posting to the server as detailed below. The CAGE should not allow the user to proceed with the download process if they have not entered a required DAC value.

Download Request Details

If the CAGE believes it can support the airlet based on the information contained in the registry, it may post a "download request" using either the HTTP or HTTPS protocols as specified in the airlet registry. The download request is an XML document with a standard structure. After receiving the posting, the server may send either the requested airlet or an error response. The server may choose to deny the download request.

| Sample airlet download request |
| --- |
| <get uri='http://apps.acmebank,com/billpay"everion="1.1.03"1.5" form="b" rkey="5225783"><br>    <dac name="fname" value="John"/><br>    <dac name-"season" value="spring"/><br></get> |

| DTD for the airlet download request |
| --- |
| <?xml version='1.0 encoding='UTE-8' ?><br><!ELEMENT get (dac*)><br><!ATTLIST get<br>    uri                     CDATA #REQUIRED<br>    version             CDATA #REQUIRED<br>    cc                      CDATA #REQUIRED<br>    rkey                 CDATA #IMPLIED<br>><br><!ELEMENT dac EMPTY><br><!ATTLIST dac<br>    name                 CDATA #REQUIRED<br>    value                CDATA #REQUIRED<br>> |

The "get" element-specifies exactly which airlet description the CAGE wishes to download. The "uri" attribute contains the airlet URI, and "version" the airlet version number, both as specified in the previously-obtained airlet registry. The "cc" attribute contains the airlet compatibility code as specified in the registry. The "rkey" attribute values must contain the "rkey" value from the airlet registry's "airlet" element, if one was provided.

The download request may also contain "dac" elements specifying user-entered values to the DAC queries specified in the airlet registry. The "name" attribute is the same as the "name" attribute from the airlet registry's "dac" element, and the "value" attribute contains the user-entered value. The CAGE is required to submit a "dac" element for each non-empty DAC response entered by the user, but may choose to omit sending "dac" elements for empty values, to save on transmission size.

Once the server has received and reviewed the download request, it may respond with the airlet envelope using Multipurpose Internet Mail Extensions (MIME) type "application/x-airlet", or if the server chooses to deny the download requested, it may send an error response instead with MIME type "text/xml". The table below indicates the MIME type of the various responses from the server.

If the download is successful, the CAGE must store the request key (the "rkey" attribute from the "airlet" element in the airlet registry) if one was specified, as this value is required during subsequent upgrade and activation requests.

Download Error Responses

Download request error responses from the server take the form of XML documents, which contain an error code and an optional description of the error. The error codes are differentiated at the level of actions the CAGE receiving the error can take, and not necessarily by the cause of the error.

The optional "dac" elements may be specified if the error is an "invalid DAC values" error, and these elements serve to enumerate the exact DACs, which the server considered invalid. In this case, the "name" attribute of the "dac" element specifies the DAC name as specified in the airlet registry and download request, while the text-node child of each "dac" element specifies the reason it is invalid.

Authorization

In some circumstances, it may be desirable to have the CAGE verify authorization to use particular airlets. This may apply in cases such as corporate environments, where the device owner is different from the user and the owner wishes to control which airlets can be run on the device. The authorization step of the airlet lifecycle is strictly optional and is left as detail to be worked out by the CAGE implementer and the device purchaser.

Authorization protocols may choose to perform the authorization check at any time during the airlet's lifecycle. Logically, it makes the most sense to perform authorization before the airlet is allowed to run the first time. For airlets acquired through the negotiated download process, the ideal time for performing authorization checks would likely be just after the airlet registry is received, to avoid downloading an airlet envelope, which would be subsequently denied through authorization.

In the interest of promoting compatibility between different CAGE implementations, which choose to support airlet authorization, a default "simple airlet authorization protocol" (SAAP) is described in the section "Simple Airlet Authorization Protocol". CAGE implementations are not required to implement this particular authorization protocol and may choose to ignore authorization completely or implement a proprietary authorization mechanism. However, SAAP may be useful to enable a wider variety of CAGE implementations to work with an authorization server "out-of-the-box".

Activation

Activating some airlets is required because communication between the airlet and its home server is designed to be completely asynchronous, so both parties must be able to uniquely identify each other for ongoing intermittent communication. This is enabled through the use of an "incarnation" communication context. The CAGE and server also need to negotiate the optimal, mutually-supported communication protocol ("relay") for all further communication in the incarnation.

The incarnation context also allows the CAGE implementation to support multiple independent instances of the same airlet. While CAGE implementations are in no way required to support multiple independent instances of an airlet, it may be especially useful in cases where there re multiple users on a device. Each user-airlet combination can be downloaded and activated separately, receiving a unique incarnation ID. In ongoing communication, the incarnation ID can be used by the CAGE to uniquely associate data received from the server to a particular instance (and potentially user) of the airlet on the device. If the server used some form of device identity (such as IP address) instead of the incarnation ID for specifying the "destination" for data, the CAGE would be unable to determine which airlet instance the data was for.

Some airlets have an optional attribute in the airlet envelope specifying the "activation URL" through which the airlet is activated. For airlets, which are designed to communicate with a globally-unique home server, the activation URL can be encoded in the airlet envelope directly. Some airlets may have many potential home servers and cannot easily have the activation URL embedded in the airlet envelope when the description is downloaded. For example, an email-reading airlet would need to communicate with the user's own email server, which may not be known by the airlet developer or the provisioning authority. For furry airlets, which do not include the activation URL in the airlet envelope, the CAGE must procure the activation URL from the users prior to activating the airlet.

The CAGE implementation may choose to perform the activation step for furry airlets at any time after obtaining the airlet envelope, but it must be performed before the airlet is executed for the first time. The airlet is never "aware" of the activation step, as it is handled entirely by the CAGE prior to the airlet starting for the first time.

Activation requires a synchronous exchange of information between the CAGE and the airlet's home server. The CAGE contract the activation URL for the airlet is activating, sending the airlet's URI and a list of "relays" (protocols for all further communication) supported by the CAGE. The server responds with either an error message or success notification. Success notifications contain an incarnation ID for use in all further communication with the server, as well as the relay the server has selected for all further communication.

Activation may be performed over the HTTP or HTTPS protocols (depending on the activation URL) as described in the "Activation Details" section below. Every CAGE is required to support at least the HTTP protocol. If the airlet activation URL is HTTPS and the CAGE does not support HTTPS activation, the CAGE may attempt activation over HTTP, but the server may choose to deny HTTP-based activation.

As soon as the incarnation ID has been procured from the server, normal airlet use within the CAGE may commence, and the server may start pushing data to the airlet through the relay using incarnation context (or, if the negotiated relay does not support push, the server may start accumulating information for the incarnation).

Activation Details

To ensure interoperability between all CAGE and server implementations, the activation protocol is standardized and explicitly defined here.

To activate an airlet, the CAGE must post an XML document of HTTP or HTTPS to the airlet-specific activation URL. The server may use the same URL for activating multiple different airlets, but the CAGE must not ever assume this. The activation request message contains the basic identification information for the airlet being activated, such as the airlet URI, version and compatibility code, and a list of relays supported by the CAGE implementation. It may also optionally include a specification of the CAGE vendor and version.

Upon receiving the activation request, the server shall synchronously respond with either an error or success message. Success message are encoded as an XML document containing the server-generated incarnation ID, selected relay, and any relay-specific information needed for further communication. Error responses may conform to the activation XML DTD or can be any of the HTTP or HTTPS error responses.

Incarnation ID Semantics

Incarnation Ids are generated by the server and provided to the CAGE during airlet activation. The server must generate a unique incarnation ID for each activation of a particular airlet (with a unique URI), consisting of no more than 16 characters.

Normal Use: Communication

During normal airlet use, the CAGE may interpret the airlet and allow the user to interact with it. Airlets are also allowed to communicate with their home server during normal use.

When the airlet generates a message to be sent, the CAGE is responsible for accepting the message and enqueuing it in a message buffer so that it can be delivered to its intended recipient asynchronously from the airlet. The CAGE should not suspend interpretation of the airlet or user interaction with an airlet simply because the airlet has sent a message; airlets are designed to communicate asynchronously. Exactly how and when the message is delivered to its intended recipient is dependent on the airlet type (anonymous or furry) and other details, as described later.

The CAGE is also responsible for accepting incoming messages from external entities on behalf of the airlet. Exactly how and when messages arrive for airlets is dependent of the airlet type (anonymous of furry) and on other details, as described in the subsequent sections. After a message has arrived for an airlet, the CAGE passes the message to the appropriate message handler in the airlet. The CAGE is not required to deliver incoming messages to the airlet's message handler immediately upon their arrival. If the recipient airlet is running in the CAGE when a message arrives, the CAGE may deliver the message to the appropriate handler at a convenient time, subject to the restrictions placed on AirML interpretation as described in the AirMl document. If the recipient airlet is not running in the CAGE with a message arrives, the CAGE implementation is encouraged to deliver the message to the appropriate message handler as soon as possible, but may choose to wait until the next time the airlet is run by the user.

Anonymous Airlet Communication

During normal use anonymous airlets may send messages to the server through the CAGE framework. When the airlet requests that a massage be sent to the server the CAGE is responsible for enquereing each message and delivering them to the server in order in which the airlet requested they be sent. Each message is sent by the CAGE to the server through a synchronous message post, which may occur at any time after the airlet has requested a message to be sent. The server response message to each individually posted message is collected by the CAGE and delivered to the appropriate message handler in the airlet ion the order in which they are received by the CAGE.

Regardless of exactly when messages are sent to the server, the CAGE is required to send the messages in the order in which the airlet generated them. Likewise, messages received from the server must be delivered to the airlet message handle in the order in which they were received.

Furry Airlets Communication

Furry airlets send messages to the server, and the server to the airlet, through the communications relay negotiated at activation. The server framework and CAGE may also exchange administrative "system" messages within the incarnation context during this period.

All messages sent over the communications relay between the server and the CAGE (in either direction) after the activation process logically consists of a common set of fields, regardless of the relay type being used. Individual relay types may choose to encode these fields in different ways at their discretion.

Message Fields

| Field Name | Description |
| --- | --- |
| Incarnation ID | The incarnation ID given to the CAGE from the server during the activation process. This ID allows the server and CAGE to maintain an ongoing "conversation" even though the connections may be intermittent and infrequent. |
| Airlet URI | This is the unique identifier for the airlet that the incarnation ID if for. This is logically required because the CAGE may be communication with multiple independent servers for different airlets. Because independent servers could assign the same incarnation ID to different incarnation contexts in which a single CAGE is involved, the incarnation ID alone may be insufficient for the CAGE to determine what airlet an incoming message is meant for. In addition, because each server is required to generate unique incarnation Ids based only on unique airlet URIs, it is possible that the incarnation ID sent from the CAGE to the sever is insufficient for the server to resolve which type of airlet the message is meant for. By including, the airlet URI in all messages sent in both directions, such ambiguities can be resolved should they occur. Individual relay implementations may encode messages in a manner which prevents these ambiguities without including the airlets URI |
| Message type | Either "application" (meaning the message is intended for the airlet or server-side application logic) or "system" (meaning the message is intended for the CAGE or server framework). |
| Action | An identifier for the purpose of the message. This is a simple string (as opposed to XML data). |
| Acton data | The XML data (if any) being transferred with the message, associated with the action. This can be through of as the "payload" of the message. |

Every server supporting furry airlets is required to support the MEGDO-HTTP or MEGDO-HTTPS-based relays (or both) specified in this document, to provide a minimum "common ground" with which every CAGE implementation can communicate. For this reason, CAGE implementations can communicate. For this reason, CAGE implementations supporting furry airlets should support these default relays to guarantee that they can communicate with every server. The message field encoding for these defaults relays is specified in the section "MEGDO-HTTP and MEDGO-HTTPS Relays"

Application Messages

The content of application-type messages is intended for the airlet on the CAGE or the server-side application logic, and not for the supporting framework on either side. The action and action data for these message types are the responsibility of the airlet and its corresponding server application logic. The CAGE is responsible for adding the appropriate incarnation ID, airlet URI and "application" message type to messages sent from the airlet, encoding them as appropriate for the relay selected by the server at airlet activation, and sending the message over the relay.

System Messages

The content of system-type messages is intended for the CAGE or server-side framework and not for the airlet or server-side application logic. System messages indicated things such as error, upgrade requests or general administrative requests, which occur within the context of an incarnation.

Examples of messages include an "upgrade required" action. The "upgrade required" action is sent by the server to the CAGE, when the server requires that a new version of the airlet be downloaded. A "reset airlet" action is sent by the server to the CAGE to destroy an incarnation of an airlet. A "reactivate airlet" action can be sent by the server to indicate that the CAGE should terminate the existing incarnation with the server and re-activate the airlet. A "destroy airlet" action can be sent by the server to indicate to the CAGE that the airlet instance must be destroyed. A "suspend airlet" action, is sent by the server to the CAGE when the server requires that the airlet incarnation be suspended. The "unsuspend airlet" action is sent to the server by the CAGE when the server wishes to unsuspend an airlet that has been previously suspended. The "terminate incarnation" action is sent when either party wishes to terminate the incarnation, or if either party does not recognize an incarnation ID as one that it is a party to. The "upgrade available" action can be sent from the server from the case when a new version of the airlet is available. An upgrade recommendation action can be sent to the server to the CAGE when a new version of the airlet is available and the server recommends upgrading it. A "get version" action can be sent from either party and has a slightly different meaning based upon the recipient. This information request can be useful to the server to vary responses based on version of an airlet and can be helpful to the CAGE in determining whether an upgrade is available. If the CAGE receives a "get version" message it responds with the version information of the current airlet. When the server receives a "get version" information message, it responds with information about the latest supported version of the airlet. A version information response message is sent in response to a "get version" information message.

Airlets can be suspended when the CAGE receives a system message of "upgrade required" or "suspend airlet". During suspension, the CAGE is not required execute any message handler on screen definitions for the airlet. The CAGE does queue all messages sent to the airlet until the suspension has been broken. The CAGE should examine the system messages while suspended and take appreciate actions for each system message received. Suspension can be broken by unsuspending the airlet, terminating the airlet or by the CAGE removing the airlet to break the suspension. It is possible that the CAGE can allow the use of an airlet after its incarnation has been terminated. In those cases, messages from the server to the CAGE for the airlet are destroyed.

The airlet in some cases can be upgraded. In these cases, a later version of the airlet is downloaded. Compatibility codes can be used to enable the CAGE to handle an airlet upgrade. Each airlet should have a compatibility code. The compatibility code can be broken into an incompatibility revision index (II) and a compatibility revision index (CRI) each of which are integers are greater than equal to "0". Using the compatibility code the CAGE can determine whether a new airlet is completely backward compatible with the old version. Performing backward compatible upgrades should not cause problems. The CAGE can then download the new airlet without removing the existing data store or reactivating the airlet. An incompatible upgraded requires the resetting the airlet data store as well as potentially reactivating the airlet. The CAGE should warn the user that the download would require resetting the airlet store.

Reactivation of an airlet occurs when the CAGE wishes to restart an airlet. The action requires removal of the existing airlet's local data store to insure proper airlet operation. There are many reasons an airlet instance may need to be removed from a device, such as user-initiated removal, airlet-initiated self-removal, incompatible upgrades, or receipt of a "destroy airlet" system message.

Relays

Relays are a "protocol" through which ongoing, asynchronous communication between the CAGE and server are hosted for furry airlets. As long as both the server and CAGE understand how to send communication messages through a relay and the common message fields are available to both codes, the details of the relay implementation are not important. Specifically, some relay implementations may make use of intermediaries such as gateway servers or proxies. Each implementation may encode, encrypt or compress the data in different ways, or organize the individual message fields indifferent manner. Relay implementations may utilize any mix of synchronous or asynchronous underlying protocols, so long as the airlet always has an abstraction treating all message sending and receiving as asynchronous. The relay abstraction serves to isolate these complexities from the airlet implementer.

Relays may also make use of multiple underlying protocols and encompass a range of communication mechanisms, which may not all be supported by the CAGE. For example, a fictitious "foo" relay may make use of FTP, HTTP and SMTP protocols. The "foo" relay may allow CAGE implementations to only support one of these underlying protocols, such that CAGE "A" uses PTP and CAGE "B" uses HTTP. The "foo" relay could make use of some initial negotiation (at activation time, as data sent inside the "relay" elements) to determine the actual underlying protocol or protocol that the CAGE understands. As long as the relay "meta-protocol" is capable of sending messages in a way that both the CAGE and server understand, the relay fulfills its purpose.

It is worth noting that relays supporting multiple underlying communication mechanisms may be very useful in avoiding unnecessary proliferation of relay types that must be understood by the server.

Relay implementations may vary greatly in terms of specific supported features. Some implementations may guarantee things such as message delivery, message order, true asynchrony, security or timeless, while others may not. Some airlets will definitely require some or all of these features to be implemented by the relay to operate properly, but others might benefit from the lower overhead of relay by the relay to operate properly, but others might benefit from the lower overhead of relay implementations not implementing certain features if they are not required. For this reason, there are not restrictions placed on relay implementation in terms of when data is sent, or how it is sent; relay implementations only need to be concerned with what is sent.

Because the activation server should know the communications requirements of each individual airlet, it is the responsibility of the activation server to choose the best relay for the airlet being activated from the list of supported relays the CAGE provides in the activation request. In some cases, the communications requirements for the airlet may not be met by any of the relay implementations mutually supported by the CAGE and server; in this case the server may choose to deny activation completely, or may make concessions on relay functionality and choose an implementation which "best fits" the needs of the airlet. Having the activation server make this decision relives the CAGE and airlet of knowing all the capabilities of each relay implementation.

Relay Name Semantics

Relay protocols are identified through the use of relay URIs (Uniform Resource Identifiers) [RFC2396]. Relay URIs are used by the server and CAGE to uniquely identify the relay type, and therefore should have the characteristics of persistence and uniqueness. These URIs are used for identification purposes only and will not be used for retrieval of any sort. In these respects, relay URIs are very similar to URNs [RFC 2141] in that they do not specify the location of any thing, but only serves to identify an abstract resource.

This specification details a standard "MEGDO-HTTP" (Message Encoding Guaranteeing Delivery and Order over HTTP) relay, which has the uniquely identifying URI http://airlet.spec/megod-http, and a standard "MEGDO-HPPTS" (Message Encoding Guaranteeing Delivery and Order over HTTPS) relay whose URI is http://airlet.sMec/megdo-https. Both of these relays are described in detail in the section "MEGDO-HTTP and MEGDO-HPPTS Relays".

Because supported relay URIs must be enumerated by the CAGE at airlet activation time, the URIs should be kept as small as possible to minimize the size of the activation request document.

Simple Airlet Authorization Protocol

The authorization mechanism recommended for CAGE implementations choosing to support the optional authorization airlet lifecycle step is referred to as the simple airlet authorization protocol, or SAAP. The basic model for SAAP is to have the CAGE send information necessary to identify an airlet to an authorization server in a authorization request, which then responds with an authorization verdict.

It is important to note that the authorization server URL to be used in the SAAP may need to be configured by the device owner, which may be different than the CAGE user. In many cases, the authorization step may not be required for the environment the CAGE is deployed in, so it may also be desirable to allow disabling of the authorization step completely. Allowing CAGE users to configure such properties would defeat the purpose of airlet authorization, so the CAGE should take appropriate steps to ensure that the authorization properties can only be changed by the appropriated entity. The exact mechanism through which this should be handled is left open to the CAGE implementation.

The authorization server URL may specify any protocol supported by the CAGE, but it is recommended for both the authorization sever and the CAGE implementations to support HTTP and HTTPS URLs.

The SAAP authorization request step should be preformed by the CAGE before the airlet is allowed to run for the first time. For airlets acquired through the negotiated download process, the authorization step should be undertaken after the airlet registry has been obtained, but before the airlet download request is sent to the server.

Authorization Request

The authorization request is encoded an XML document with a standard structure, and contains values necessary to uniquely identify the airlet to the authorization server.

An "auth" element's "uri" attribute is the airlet URI as reported in the airlet envelope or registry. Because the airlet URI is independent of versioning or instance information, it is not sufficient to uniquely identify the airlet instance being authorized. "Version" and "cc" attributes specify the version and compatibility code of the airlet respectively, as specified in the airlet envelope or registry. A "vendor" attribute corresponds to the vendor specification in the airlet registry or envelope, and must be included in and only if the vendor field or the registry or envelope is specified.

After constructing an authorization request document, the CAGE should post the document to its internally-configured authorization server URL over the protocol specified in that URL.

Authorization Response

Upon receiving the authorization request document, the authorization server responds with an authorization verdict encoded in an XML document with a standard structure.

As "ok" attribute of the "auth" element indicates whether the airlet is authorized to run in the cage or not. A value of "y" indicates that the CAGE is allowed to run the airlet, while a value of "n" means that the airlet is not authorized.

A "desc" element is optional and may contain a description of why airlet authorization is being denied. This description is not intended to be understandable by the CAGE, but as something which may be presented to the user. The meaning of a description included in a successful authorization response is undefined.

MEGDO-HTTP and MEGDO-HTTPS Relays

This section specifies the MEGDO-HTTP (Message Encoding Guaranteeing Delivery and Order over HTTP) and MEGDO-HTTP (Message Encoding Guaranteeing Delivery and Order over HTTPS) relays. Both are based on very commonly supported protocols (HTTP and HTTPS) minimizing the amount of work a CAGE or server implementer would need to take to implement them. Neither relay supports true pushing of messages from the server to the device, but they do implement guaranteed delivery, message ordering, and (in the HTTPS case) end-to-end security using a fairly lightweight scheme. Both relays utilize an identical message encoding and tracking scheme; the only difference is the underlying protocol over which the messages are sent.

The lack of support for true push is a serious drawback for devices, which are usually connected to the network, as the CAGE is forced to poll about messages waiting on the server. However, for devices, which are not commonly connected to the network, or have no stable network address, these relays may provide a near-ideal situation as they do not require the server to know even a virtual network address of the CAGE.

Overview

The MEGDO relays are based on a simple model for exchanging messages between the server and CAGE in a manner guaranteeing the order in which messages arrive and that not messages are "dropped in transit". At the highest level of the model, both the server and CAGE maintain queues of messages to be sent to the other party, one queue per valid incarnation over a MEGDO-relay. The CAGE is responsible for contacting the server occasionally for a "message exchange", during which messages from the front of each party's queue for the incarnation are sent to the other, along with acknowledgements for previously received messages. Messages are only removed from the queues when an acknowledgement has been received. Utilizing this simple scheme ensures that both the server and CAGE receive messages in the order in which they are sent and that not messages are "skipped-over".

To accommodate this model, each message is assigned an integer ID unique to the sender of the message. Ids are assigned starting at 1, and each subsequent message to be sent has an ID on greater that the last message. For example, the first message the CAGE places in its queue to be sent to the server has message ID (MID) "1", the next has MID "2", then "3", "4", and so on. Likewise, the first message the server places in its queue to be sent to the CAGE has MID "1", then "2", "3", and so on. It is important that the MIDs assigned to messages remain contiguous, as this is the mechanism by which any "skipped" message can be detected.

When the CAGE contacts the server for a message exchange, it uses an HTTP (or HTTPS) POST operation to post an XML document encoding messages from the beginning of its queue (those with the lowest message Ids), as well as an acknowledgement for the highest-numbered contiguous MID it has received successfully from the server. Upon receiving this post, the server may remove all messages in its queue for the incarnation which have a message ID less than or equal to the acknowledged MID sent in the post. The server then responds with an XML document encoding messages from the beginning of its queue (with the lowest message Ids) and an acknowledgement of the highest-numbered contiguous MID it has received successfully from the CAGE. Upon receiving the response, the CAGE may remove all messages from its queue for the incarnation which have a message ID less than or equal to the acknowledged MID sent from the server.

If something should go wrong during the message exchange process, this algorithm allows the problem to be easily detected and corrected without "dropping" messages or allowing them to be sent out-or-order.

AirML Language

Airlets are written in the AirML language. The AirML language is based on the XHTML Mobile Profile [XHTML-Mobile] and ECMAScript [ECMA262]. Because airlets are designed to have the presentation markup separated from the data being presented, unlike XHTML, many XHTML Mobile Profile features are not applicable to the AirML language, and are not used. Like XHTML Mobile Profile upon which it is based, the AirML language is not strictly "XHTML Host Language Conforming" as defined in the "Modulation of XHTML" [XHTMLMod]. Some features of ECMAScript have also been dropped to avoid necessary complexity in both the AirML language and CAGE environment.

Host Objects
Airlet
void send (string msgName, XML message)
Sends a message to the home server
void send (string URI, String msgName, XML message)
Send a message to another local entity such as another airlet or local application.
void exit( )
Causes the airlet execution to cease until the user starts the airlet again
void destroy ( )
Causes airlet self-destruction. The user is no longer able to run the airlet until it is re-acquired, and the local data store for the airlet is destroyed.
boolean refereshScreen (String screenName)
Causes the specified screen to be re-displayed (incorporating any new data from the data store) if and only if it is currently the active screen. The return value is true if the named screen was active, false otherwise.
void alert(String title, String msg, int priority)
Causes an alert to be shown to the user, although not necessarily immediately (depends on the CAGE implementation). If the airlet is currently in active use by the user, the alert will be displayed immediately, otherwise it is at the discretion of the CAGE implementation how the alert is handled. For Instance, an alert sent by an airlet not in an active use may be indicated by an icon on the device, or a change in an existing icon, and when the user next runs the airlet the alert message will be displayed.
boolean isActive( )
Returns the name of the screen currently being displayed (if the airlet is active), null if the airlet is not active.
String CurrentScreen( )
Returns the name of the screen currently being displayed (if the airlet is active), null if the airlet is not active.
browser (optional support)
display(String URL)
Triggers the display of the specified URL in the device browser.
phone (optional support)
void dial(string number)
Causes the specified phone number to be dialed (probably with user confirmation-CAGE implementation detail).

Added Keywords
show<screenname>
Causes the specified screen to be evaluated and shown. This keyword may only be used inside screen definitions—it is compile-time error if it is encountered outside a screen definition. Once a "show" keyword is encountered, further execution of the current screen definition is stopped.
print<value>
Causes the specified value to be displayed on the screen, as though it has been a normal text value in the AirML markup. Only valid inside screen definition—it is a compile-time error if it is encountered outside a screen definition.

ECMAScript Keyword Restrictions

Of the keywords supported by ECMAScript (break case catch continue default delete to else finally for function if in instance of new return switch this throw try type of var void) the "new" keyword is not allowed in AirML. The "return" keyword may not be used inside screen definitions or message handler definitions.

Compile-Time Handling

The AirML language is designed to be convertible to a purely procedural (ECMAScript) representation so as to require only host object additions to run in an exiting ECMAScript interpreter. The process for converting and AirML representation of an airlet to a purely procedural ECMAScript representation is as follows:

An additional host object ("cage") is added to the runtime environment, with functions callable to print text to the screen or to create from controls.

Screen definitions are converted to individual functions, with no parameters and a return value of the screen name to transition to next. Uses of the "show" keyword within a screen definition are converted to "return" keywords. All text-node children of screen definitions are encapsulated in calls to the cage.print( ) function, and all uses of the "print" keyword are converted to calls to the cage.print( ) function . . . .

Message handler definitions are converted to functions taking a single XML argument variable (with the variable name derived from the "data-var" attribute of the "message" element) with no return value.

Airlet Document Structure

Syntactically, AirML airlet description documents are well-formed XML documents, which can be validated [XML] against the AirML DTD. Each AirML document is divided into an airlet header, screen definitions, and message handlers. Script fragments (based on ECMAScript) may be included in some parsed character data (PCDATA) sections and attribute values by surrounding the script fragment with braces ("{and"}). Because of the embedded script fragments, it is possible for an airlet document to validate against the AirML DTD properly but still not be a proper, usable AirMl document.

---

Structural Markup
DTD fragment describing AirML structural markup

```
<?xml-version=1.0' encoding-UTF-8' ?>
<!ELEMENT airlet (head?, screen*, message*)>
<!ATTLIST airlet
    uri         CDATA #REQUIRED
    version     CDATA #REQUIRED
    cc          CDATA # REQUIRED
    sv          CDATA # REQUIRED
>
<!ELEMENT head (title?, vendor?, activation?, #PCDATA)>
<!ELEMENT title (#PCDATA)>
<!ELEMENT vendor (#PCDATA)>
<!ELEMENT activation EMPTY>
<!ATLIST activation
    url         CDATA #IMPLIED
    req         (y|n) "y"
>
<!ELEMENT screen ANY>
<!ATTLIST screen
    id          CDATA #REQUIRED
    title       CDATA #REQUIRED
>
<!ELEMENT message (#PCDATA)>
<! ATTLIST message
    action      CDATA #REQUIRED
    data-var    CDATA #REQUIRED
    source      (SERVER|ANY) "SERVER"
```

---

User Interface Markup Form DTD

```
<?xml version=" 1.0 encoding='UTF-8' ?>
<!--=======================Text Elements ==========================-->
<!ENTITY % special.pre
    "br | span | bdo | map">
<! ENTITY % special
    "%special.pre | object | img ">
<!ENTITY % fontstyle "tt | i | b | big | small ">
<!ENTITY % phrase "em | strong | drn | code | q |
        samp | kbd | var | cite | abbr | scronym | sub | sup ">
<!ENTITY % inline.form "input | select | testarea | lable | button">
<!--these can occur at block or line level -->
<!ENTITY % misc.inline " ins | del | script">
<!-- these can only occur at block level -->
<!ENTITY % misc "noscript | %misc.inline:=;">
<!ENTITY % "a | %special; | %fontstyle; | %phrase; | %inline.forms;">
<!-- % inline; covers inline or "test-level" elements -->
<!ENTITY % Inline "(#PCDATA | %inline; | %misc.inline;)*">
<!-- ================ Block level elements ==========================-->
<!ENTITY % heading "h1 | h2 | h3 | h4 | h5 | h6">
<!ENTITY % lists "ul | ol | dl">
<!ENTITY % blocktext "pre | hr | blockquote | address">
<! ENTITY % BLOCK
    "p | %heading; | div | %list | %blocktest; | fieldset | table">
<!ENTITY % Block "(%block; | form | %misc;)*">
<!-- %flow; mixes block and inline and is used for list items etc. -->
<!ENTITY % Flow "(#PCDATA | %block; | form | %inline; | %misc;)*">
<!==================== Content models for exclusion ===================>
<! -- a elements used %Inline; excluding a -->
<!ENTITY % a.content
    "(#PCDATA | %special; | %fontstyle; | %phrase; | %inline.forms: |
    %misc.inlin
e;)*">
<! -- pre uses %Inline excluding big, small, sup or sup -->
<!ENTITY % PRE.CONTENT
    "(#PCDATA | a | %fontstyle; | %phrase; | %special.pre; |
    %misc.inline; |
    | %inline.forms;)*">
<!-- form uses %Block; excluding form -->
<!ENTITY % form.content "(%block; | %misc ;)*">
<!-- button uses %Flow; but excludes a, form and form controls-->
<!ENTITY % button.content
```

| User Interface Markup Form DTD |
| --- |

```
        "(#PCDATA | p | %heading; | div | %lists; | %blocktext; |
        table | %special; | %fontstyle; | %phrase; | %misc;)*">
<!ENTITY % uiattrs
"exists          %BooleanAttr;        #IMPLIED
repeat           %RepeatAttr:         #IMPLIED"
>
<!ELEMENT br EMPTY>        <!--forced line break -->
<ATTLIST br %uiattra:
<!ELEMENT em %Inline;>     <!--emphasis-->
<!ATTLIST em %uiattrs;>
<!ELEMENT strong %Inline;>       <!--strong emphasis-->
<!ATTLIST strong %uiattrs;>
<!ELEMENT dfn %Inline;>           <!--definitional-->
<!ATTLIST dfn %uiattrs;>
<!ELEMENT code %Inline;>     <!--program code->
<!ATTLIST code %uiattrs;>
<!ELEMENT samp %Inline;>            <!--sample->
<!ATTLIST samp %uiattrs;>
<!ELEMENT kdb %Inline;>       <!--something user would type-->
<!ATTLIST kdb %uiattrs;>
<!ELEMENT var %Inline;>     <!--variable-->
<!ATTLIST var %uiattrs;>
<!ELEMENT cite %Inline;>       <!--citation->
<!ATTLIST cite %uiattrs;>
<!ELEMENT abbr %Inline;>       <!--abbreviation-->
<!ATTLIST abbr %uiattrs;>
<!ELEMENT acronym %Inline;>              <!--acronym-->
<!ATTLIST acroynym %uiattrs;>
<!ELEMENT q %Inline;>       <!—inline quote->
<!ATTLIST q %uiattras;
cite            %URI;        #IMPLIED
>
<!ELEMENT i %Inline;>       <!--italic font-->
<!ATTLIST i %uiattrs;>
<!ELEMENT b %Inline;>       <!--bold font-->
<!ATTLIST b %uiattrs;>
<!ELEMENT big %Inline;>     <!--bigger font-->
<! ATTLIST big %uiattrs;>
<!ELEMENT small %Inline;>          <!--smaller font-->
<!ATTLIST small %uiattrs;>
<!ELEMENT address %Inline;>          <!--information on author-->
<!ATTLIST addresss %uiattrs;>
<!ELEMENT hr %Inline;>     <!--horizontal rule-->
<!ATTLIST hr %uiattrs;>
<!ELEMENT p %Inline;>       <!--Paragraphs-->
<!ATTLIST p %uiattrs;>
<!ELEMENT blockquote %Inline;>          <!--block-like quote-->
<!ATTLIST blockquote
%Uiattrs;
        cite      URI:      #IMPLIED
<!—content is %Inline; excluding "img | object | big | small |
sub | sup"-->
<!ELEMENT pre % pre.content;> <-- preformatted text -->
<!ATTLITS pre
     % uiattrs;
     xml: space (preserve) #FIXED 'preserve'
>
<!======================= Lists ==========================>
<!ELEMENT ul (li)+> <!--Unordered list-->
<!ATTLIST ul %uiattrs;>
<!ELEMENT ol (li)+> <!--Order (numbered) list->
<!ATTLIST ol %uiattrs;>
<!ELEMENT li %Flow;> <!--list item-->
<!ATTLIST li %uiattrs;>
<!--definition lists - dt for term, dd for its definition-->
<!ELEMENT dl (dt|dd)+>
<! ATTLIST dl %uiattrs;>
<!ELEMENT dt %Incline;>
<!ATTLIST dt %uiattrs;>
<!ELEMENT dd % Flow;>
<!ATTLIST dd %uiattrs;>
<!--=====================Headings============================>
<!ELEMENT h1 %Inline;> <!--Heading level 1-->
<!ATTLIST h1 %uiattrs;>
<!ELEMENT h2 %Inline;> <!--Heading level 2-->
<!ATTLIST h2 %uiattrs;>
<!ELEMENT h3 %Inline;> <!--Heading level 3-->
```

-continued

User Interface Markup Form DTD

```
<!ATTLIST h3 %uiattrs;>
<!ELEMENT h4 %Inline;> <!--Heading level 4-->
<!ATTLIST h4 %uiattrs;>
<!ELEMENT h5 %Inline;> <!--Heading level 5-->
<!ATTLIST h5 %uiattrs;>
<!ELEMENT h6 %Inline;> <!--Heading level 6-->
<!ATTLIST h5 %uiattrs;>
<!================Form (user input) constructs=====================>
<!ELEMENT input EMPTY> <1--test entry control-->
<!ATTLIST input
    %uiattrs;
    type            (test | password)       "text"
    var             %Script;                #REQUIRED
    value           % StringAttr;           #IMPLIED
    maxlength       %NumberAttr;            #IMPLIED
    readonly        %BooleanAttr;           #IMPLIED
    lable           %StringAttr;            #IMPLIED
>
<!ELEMENT select (option)+> <!--option selector-->
<!ATTLIST select
    %uiattrs;
    var             %Scriptr;               #REQUIRED
    size            %NumberAttr;            #IMPLIED
    multiple        %BooleanAttr;           #IMPLIED
    label           %StringAttr;            #IMPLIED
>
<!ELEMENT option (#PCDATA)> <!--selectable choice-->
<!ATTLIST option
    %uiattrs;
    value           %StringAttr;            #IMPLIED
    selected        %BooleanAttr;           #IMPLIED
>
<!ELEMENT testarea (#PCDATA)> <!--multi-line text filed-->
<!ATTLIST textarea
    %uiattrs;
    var             %Script:                #REQUIRED
    rows            %NumberAttr;            #REQUIRED
    cols            %NumberAttr;            #REQUIRED
    readonly        %BooleanAttr            #IMPLIED
    label           %StringAttr;            #IMPLIED
>
<!ELEMENT command (%ScriptData;)> <!--context /
screen specific ommand-->
<!ATTLIST commandc
    %uiattrs
    label           %StringAttr;            #REQUIRED
    type            %StringAttr;            #IMPLIED
    priority        %StringAttr;            #IMPLIED
```

Sample airlet markup

```
<airlet uri-http://apps.acmebank.com/billpay version="1.1.03" cc"1.5"
    sv="0">
    <head>
        <title>ACMEBank</title>
        <vendor>ACME Banking System, Inc.</vendor>
        <activateion url=http://billpay.acmebank.com/
        activate"/>
        var.chosenBill;
    </head>
    <screem id="main" lable= "ACME Bank">
        <!--select all new and paid bills from the stat
        sorte -->
    var newAndPaidBills =
            datastore.bill.(@status= ='new' || @status= ='paid');
    }
    <!--Create a select-list of these bills-->
    <select name="chosenBill">
        <option repeat="{for(var bill in new AndPaidBills) }"
            value="{bill}">
        { bill.@timestamp + ' : ' + bill.@payee + ' : ' +
```

-continued

Sample airlet markup

```
            bill.@status }
        </option>
    </select>
    <!--show the "view" command only if the list isn't empty-->
    <command label= "View" type= "OK" priority = "I"
            exists= "{newAndPaidBills.length > 0}">
        { airlet.showScreen(viewbill) ; }
    </command>
    <command label = "Payment Requests" type= "SCREEN"
    priority = "1">
        { airlet.showScreen (payReq) ; }
    </command>
    <command label = "Exit" type= "EXIT" priority = "2">
        { airlet.exit ( ) ; }
    </screen>
    <screen id= "viewBill" label = "Bill: { chosenBill.@payee }">
        <dl>
            <dt> Payee:</dt>
            <dd> { chosenBill.@payee3 }</dd>
            <dt> Amount: </dt>
```

Sample airlet markup

```
            <dd> { chosenBill.@amount }</dd>
            <dt> Descripton:</dt>
            <dd> { chosenBill.@desc }</dd?
            <dt> Time:</dt>
            <dd> { chosenBill.@timestamp }</dd>
            <dt> Status:</dt>
            <dd> { chosenBill.@status }<?dd>
    </dl>
    <!--If it is a new bill, give them the "pay" option-->
    <command label = "pay" type = "OK" priority = "1"
            exists = " {chosenBill.@status = = 'new' )">
        {
            // Change it's status
            chosenBill.@status= 'payment request';
            // Send a message to the server
            airlet.send ('payBill' <bill id={chosenBill.@rd}
            />);
            airlet.showScreen (payBil)'
        }
    </command>
    <command label = "Back" type = "BACK" priority = "1"
            { airlet.showsScreen (main); }
    </command>
    <command label = "Delete" type = "SCREEN" priority = "2">
        {
            // Remove the bill from the datastore if they
            chose 'delete'
            delete datastore.bill.(@id = = choosenBill.@id);
            airlet.showScreen (main);
        }
    </command>
    <command label = "Exit" type = "EXIT" priority = "2">
        { airlet.exit ( ); }
    </command>
</screen>
<screen id = "pay Req" label = Payment Requests">
    {
        var paymentReq = datastor.bill.(@id='payment
        request');
    }
    <select name = "chosenBill">
            <option repeat =" { for (var bill in paymentReq) }
            "values = " {bill}">
                { bill.@timestame + ' : ' + bill.@payee }
            <option>
    </select>
    <!--show the "view" command only if the list isn't empty-->
    <command label = "View" type = "OK" priority = "1"
            exists = " {newAndPaidBills.length > 0}">
        { airlet.showsScreen (viewbill); }
    </command>
    <command label = "Back" type = "BACK" priority = "1">
        { airlet.showScreen (main) ; }
    </command>
    <command.label + "Exit" type = "EXIT" priority = "2">
        { airlet.exti ( ); }
    <command>
</screen>
<screen id = "payBill" label = "Payment Request" >
    Your bill payment request will be sent to the server at
    The next opportunity.
    <command Label = "OK" type = "OK" priority = "1">
        { airlet.showScreen(main); }
    </command>
</screen>
<message action = "benBill" data-var="bill">
    {
        // Add the new bill to the data store, with a status
        of "new"
        bill.@status="new";
        datastore.appendChild(bill) ;
        // If the "main" screen is currently displayed,
        refresh it
    }
</message>
<message action="statusUpdate" data-var="bill">
    {
        //See if we have the bill with the given ID in the
        data store
        var dsBill = datastore.bill.(@id= = bill.@id);
        if(dsBill.length > 0)
        {
            // We do have the bill; re-assign its status
            dsBill.@status = bill.@status:
        }
        // If the "main" screen is c urrently displayed,
        refresh it
        airlet.refreshScreen(main)
    }
    <message>
</airlet?
```

Network and Service Deployment

There are a myriad of possible configurations of network and service deployment, giving a range of possible deployments, which should satisfy the requirements of any carrier, device manufacturer and content provider alike.

There are two principal types of web service—Airlet Provisioning Web Services and Airlet Application Web Services. The former covers all services required to provision an airlets to a particular users on a particular device. The latter is the actual application web service a particular airlet uses to execute program logic and manage airlet lifecycle after activation A CAGE sends two types of messages, one for each type of web service. The first type of messages, Airlet Provisioning Messages go to Airlet Provisioning Web Services. The second type of messages, Airlet Service Messages, go to Airlet Application Web Service.

There are two methods of transport for these types of messages. The first type of transport is simple, synchronous HTTP messaging, which is used for all Airlet Provisioning Messages. The second type of transport is called the 'negotiated relay', and it handles transport of Airlet Service Messages. The concept of a 'negotiated relay' allows a particular Airlet Application Web Service to require a certain type of transport for Airlet Service Messages—for example, a Bill-pay airlet application could require the use of a secure HTTP relay for Airlet Service Messages. This relay may also support asynchronous, bi-directional messaging between the Airlet and the Airlet Application Web Service.

A server which hosts an Airlet Provisioning Web Server must support HTTP to handle Airlet Provisioning Messages. A server, which hosts an Airlet Application Web Service must host the 'negotiated relay' for Airlet Service Messages. Likewise, a CAGE which communicates an Airlet Provisioning Message to a server must support HTTP for Airlet Provisioning Messages, and a CAGE which communicates Airlet Service Messages to a server must support the 'negotiated relay' for Airlet Service Messages.

Note that what a relay can do depends on the limitation/capabilities of the network. For example, if a network supports HTTPS, a relay can be written to use HTTPS.

The only specific configuration requirements for CAGE developers and server developers are, for an Airlet Application Web Server which needs to communicate with a given CAGE on a given device:

1) write or obtain a relay driver to interface with the required/desired network protocol,
2) host the relay driver on the server which is also hosting the Airlet Application Web Service, 3) and host a corresponding relay driver on the CAGE which runs of the device ... where the Airlet Application Web Service can be hosted in any combination behind or in front of a corporate firewall, or in the carrier network itself, depending on the requirements of the parties involved.

Server side applications can be written to interface with the airlets on the mobile devices. Once the airlet client is implemented and the client server interface in the form of XML data messages have been defined, the application development for the server side can be done. Server side application can interface with the airlets.

Two different models are described, the restricted and the full model. The restricted model is simpler. The full model allows calling a framework messages as well as allowing the use of hooks to be called by application lifecycle events.

The restricted model is described first. The application developer creates a single java web service (JWS) that the airlet will communicate with. All out going airlet messages will call the JWS. The server side application or web service is defined to produce the expected messages for the airlet. Since airlet messages consists of an action name and piece of XML, the system can take the message and use it to call a java web service message whose name is the message action name. Weblogic workshop's XML mapping function can be used to map the action data expected in the method to the JWS method parameters. If a java web service method returns the value, the return data will be packaged into a method for the client. The action name will be a method name response and the action data will be generated from the return XML. An XML map can be used to shape the return value into the XML format expected. The java web service message can be conversational or not. In one embodiment, multiple conversations are not allowed, and the device is only involved in a single conversation at one time. This simplifies the operation of the system. Callbacks as defined by Weblogic Workshop can be used to a sequentially pushing data to the device. To execute a push, a callback method is defined in Weblogic workshop. The method name in the java web service should be the same as the action name that the airlet expects. An XML map can be used to define the action data. Since device push is implemented with callbacks, a conversation must be started with a device before data can be pushed to it.

The simple version of BillPay has the following use cases:

Bills are created in an external banking system. Notifications of these bills is sent to the users devices. A user can choose to pay a bill. Payment requests are handled by the banking system, and the status of payment requests is communicated back, to the device. A payment request can either succeed, fail, or be placed on hold.

The sample multichannel solution models this system with two components: the Band web service, representing the external banking system, and the BillPay jws file, which is the multichannel component that the device communicates with.

Here is the sample flow:
Bills are created by Bank
Bank notifies BillPay of a new bill through a callback (method: onNewBill).
BillPay pushes the notification to the device (method: onNewBill).
The user (at this/her discretion) uses the airlet to issue a payBill message.
The pay Bill message is routed to the BillPay jws (method: payBill).
BillPay forwards the payment request to Bank (method: userPayBill).
Bank asynchronously responds with the success status of the request through a callback (method: onBillPaid).
BillPay forwards the response to the device through its callback (method: onBillUpdate).

In one embodiment, you need to have a conversation set up to have the callback available to push to the device. So we have a startup method, connectToAccount, that has to be called by the airlet upon activation. This method is a conversational "start" method in BillPay JWS, and it also starts a conversation with Bank (so Bank can use its callback to notify BillPay of new Bills).

The full model adds programming elements to the restricted model. This gives the application programmer more flexibility and power, at the cost of more complexity and an extended learning curve.

The extra features of the full model come in two flavors: exposed framework calls, and hooks in the jws.

Framework Calls

A jws file used for multichannel. Extends a basic system class. This class has two methods that can be called from within the developer's jws file:

public void startCoversation (String sessionId, Map startMethodArguments)

Public void finishCoversation (String sessionId, Map FinishMethodArguments)

The point of these methods is to allow you to start on stop a conversation from within a non-conversational method. These methods allow the shift of more logic to the server.

For example, suppose you want to make the user authenticate before allowing the server to push to the device. To do this in the restricted model, you would need to:

have the client call the server synchronously with the authentication information the server would return the result of the request (success or failure) if the call succeeded, the client could start a conversation with the server.

With the full model, most of the processing can be done on the server side; the client calls the server the authentication information if authentication succeeds, the server can start a conversation JWS Hooks The server framework will call the following methods in the jws with the indicated contingencies. The hooks are always optional, except for the start and finish conversation methods described above. If on does not exist in the jws, the framework will pass it over.

When an application is first installed, the jws method onAppInstall will be called. This method takes no arguments and has no return value.

When an airlet registry is created for a CAGE, the jws method getDACs will be called. This method takes no arguments and returns an array of DAC objects (defined in com.bea.mcafe.websvc.DAC). It's expected that this method returns a constant array, and in the future will be completely authored by editing a properties sheet.

When a CAGE requests a download of the airlet, the method authorizeDownload will be called. This method takes an array of DAC names and an array of values for those DACs that the CAGE user has entered. The method returns a Boolean depending on whether the DACs are deemed valid or not.

When the cage activates the airlet, the jws method sessionStart will be called. This method takes one argument, the session id, and has no return value.

When the base class startConversation method is called (from the user jws), the user jws method MCAFE_onConversationStarted is called. This is a start conversation method that takes a user-defined argument list and no return value.

When the base calls finishConversation method is called (from the user jws), the user jws method MCAFE_onConversationFnished is called. This is a finish conversationmethod that takes a user-defined argument list and no return value.

When the cage deactivates the airlet
if there is currently a session, the jws method MCAFE_on CoinversationFinished is called.
the method sessionFinish is called. This method takes one argument, the session id, and has not return value.
When an application is removed, the jws method onAppRemove will be called.
Here is a summary of the hoods, along with any restrictions they might have.

BillPay forwards the response to the device through its callback (method: onBillUpdate).

A computer system or network that can be used in accordance with, or for components of, the present invention, or to implement methods for the present invention, can include a processor unit and main memory. The processor unit may contain a single microprocessor, or may contain a plurality of microprocessors for configuring the computer system and/or network as a multi-processor system. A main memory can store, at least in part, instructions and data for execution by a processor unit. If an embodiment in accordance with the present invention is wholly or practically implemented in software, main memory can store the executable code when

| Method Name | When Invoked | Restrictions |
| --- | --- | --- |
| onAppInstall | When the application is installed in the server. | Any return value is discarded. must be non-conversational. |
| GetDACs | When the server collects airlet registry information. | must not be message-buffered. must be non-conversational. |
| AuthorizeDownload | When a CAGE requests a download of the application. | must not be message-buffered. must be non-conversational |
| sessionStart | When an airlet is activated in a cage. | must not be message-buffered any return value is discarded must be non-conversational |
| MCAFE_onConversationStarted | When the base class method startConversation is called. | Must be a conversational Start method. any return value is discarded advised to not be message-buffered, to avoid racing with the method stat called it. The caller of basecalss.startConversation should be non-conversational. |
| sessionFinish | When an airlet is deactivated in a cage. | Any return value is discarded must not have a call to finishConversation within this method must be non-conversational |
| MCAFE_onConversationFinish | When the airlet is deactivated in a cage, before sessionFinish is called. When the base class method finishConversaton is called. | any return value is discarded must be a conversation finish method advised to not be message-buffered, to avoid racing with sessionFinish The caller of baseclass.finishConversation should be non-conversational. |
| onAppRemove | When the application is removed from the server. | Any return value is discarded Should be non-conversational |

Example—BillPay

See the description of BillPay in the restricted model section for an explanation of the requirements and components of the application.

The sample flow, after initialization, is the same. We'll repeat it here:
Bills are created by Bank.
Bank notifies BillPay of a new bill through a callback (method: onNewBill).
BillPay pushes the notification to the device (method: onNewBill).
The user (at his/her discretion) uses the airlet to issue a payBill message.
The payBill message is routed to the BillPay jws (method: payBill).
BillPay forwards the payment request to Bank (method: userPayBill).
Bank asynchronously responds with the success status of the request through a callback (method: onBillPaid).

an operation. Main memory can include banks of dynamic random access memory (DRAM), high-speed cache memory, as well as other types of memory known in the art.

A system can further include, for example, a mass storage device peripheral devices, user input devices, portable storage medium drives, a graphics subsystem, and an output display. The components can be, in some embodiments, connected via a single bus. However, as will be apparent to those skilled in the art, the components may be connected through one or more data transport means. For example, a processor unit and main memory may be connected via a local microprocessor bus, and the mass storage device, peripheral devices, portable storage medium drives, and graphics subsystem may be connected via on or more input/output (I/O) buses. A mass storage device, which may be implemented with a magnetic disk drive, optical. Disk drive, as well as other drives known in the art, is a non-volatile storage device useful. For storing data and instructions for use by a processor unit. In one embodiment, a mass storage device can store software for implementing an embodiment of the present invention for purposes of, for example, loading to main memory.

A portable storage medium drive can operate in conjunction with a portable non-volatile storage medium, such as a floppy disk, to input an output data and code to an from the computer system or network. In one embodiment, the system software for implementing the present invention is stored on such a portable medium, and is input to the computer system via the portable storage medium drive. Peripheral devices may include any type of computer support device, such as an input/output (I/O) interface, to add additional functionality to the computer system. For example, peripheral devices may include a network interface for connecting the computer system to a network, as well as other networking hardware such as modems, routers, or other hardware known in the art.

User input devices provide a portion of a user interface. User input devices may include, for example, an alpha-numeric keypad for inputting alpha-numeric and other information, or a pointing device, such as a mouse, a trackball, stylus, or cursor direction keys. In order to display textual and graphical information, a computer system or network can include a graphics subsystem and output display. An output display can include a cathode ray tube (CRT) display, liquid crystal display (LCD) or other suitable display device. A graphics subsystems can receive textual and graphical information, and process the information for output to a display. Additionally, the system can include output devices. Examples of suitable output devices include speakers, printers, network interfaces, monitors, and other output devices known in the art.

The components contained in a computer system or network in accordance with the present invention can be any that are typically found in computer systems or networks that are suitable for use with certain embodiments of the present invention. Embodiments and examples include herein are intended to represent only a sampling of a board category of such computer components known in the art that can be used in accordance with embodiments of the invention. Thus, the computer system can be a personal computer, workstation, server, minicomputer, mainframe computer, or any other computing device. The computer system can also incorporate different bus configurations, networked platforms, multi-processor platforms, etc.

Various operating systems can be used including Unix, Linux, Windows, Macintosh OS, Palm OS, and other suitable operating systems. The network may include at least one such computer system or processing device, and may include other network components and architectures known in the art, such as servers, clients, interfaces, routers, Ethernet LANs, intranets, terminals, databases, and relays. Software used with certain embodiments may comprise frameworks, plug-ins, objects, architectures, and other applications, software components or interfaces known or developed in the software arts. The software may be programmed in any appropriate language or using any tool known or developed in the software arts, such as may include Java, C++, ActiveX, Assembly, Perl, Delphi, Fortran, COBOL, SQL, HTML, Javascript, Visual Basic, ASP, Cold Fusion, Palm, PHP, Oracle, and CGI, and may use any aspects or approaches used with those languages that are known in the art, such as Java classes, language translator, and plug-in components.

The foregoing description of preferred embodiments of the present invention has been provided for the purposes of illustration and description. It is not intended to be exhaustive or to limit the invention to the precise forms disclosed. For the purposes of this application, the term "processor" includes one or more processor, the term "server" includes one or more servers, and the term "memory" includes one or more memories or memory chips. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A system for providing access between an application at a mobile device, and a web service at a server, comprising:
    a processor;
    a server comprising the processor, database, provisioning service, store and forward manager, web service, and one or more interface plugins for use by different types of mobile devices;
    the mobile device comprising a memory, processor, and software application executing thereon, wherein the mobile device further comprises
        a runtime environment program, which displays software applications provisioned by the provisioning service, wherein the runtime environment program interacts with the server via an interface to receive provisioned applications and asynchronously update application data between the mobile device and the database,
        a software application, which is provided by the provisioning service in a markup language and which is displayable on the mobile device by the runtime environment program, wherein each independent instance of the software application receives a unique incarnation ID, which is used by the runtime environment program to uniquely associate data received from the server with a particular instance of the software application on the mobile device,
        an application data store, residing in the memory of the mobile device, which is used to store the application data for use by the software application, and templates for use by the runtime environment program in displaying the software application and the application data therein, and wherein the application data at the mobile device is persisted locally with the database at the server when a connection between the mobile device and the server is available, including when the software application is either running or not running; wherein, while the software application executes on the mobile device, the runtime environment program sends messages to the server through its interface, in a lower level message transport format associated with that mobile device type, to retrieve, use, or update the application data; and
    wherein the server receives the messages, through an interface plugin configured for that mobile device type, and converts the messages received from the runtime environment program into messages that are independent of mobile device type, for subsequent communication to the web service, and provides responses accordingly, including using the store and forward manager to store the responses at the server until the connection between the mobile device and the server is available.

2. The system of claim 1, wherein the mobile device and the server use asynchronous messaging.

3. The system of claim 1, wherein messages are stored until a connection between the mobile device and server is available.

4. The system of claim 1, wherein the application receives data from the web service.

5. The system of claim 1, wherein the messages sent from the mobile device to the server are sent as a block of data in a simplified message format which contains a fragment of a file in the markup language format.

6. The system of claim 1 wherein the system supports a plurality of different types of mobile devices, by providing at the server a transport manager and a different plugin for each mobile device type, which understands the lower level message transport format or protocol used by the type of mobile device.

7. The system of claim 1 wherein the application data for use by the software application, and the templates for use by the runtime environment program in displaying the software application, are stored separately within the mobile device, so that new data can be received from the server without having to generate new markup language for displaying the software application.

8. The system of claim 1, wherein the application data store includes a list of available software applications on the server.

9. The system of claim 1, wherein the software application running within the runtime environment program includes a collection of screens containing user interface information and message handlers which process messages received from the server.

10. The system of claim 1, wherein the software application running within the runtime environment program can operate as multiple independent instances of the same software application, and wherein each multiple independent instance receives a unique incarnation ID, which is used by the runtime environment program to uniquely associate data received from the server with a particular instance (and potentially user) of the software application on the mobile device.

11. A method for providing access between an application at a mobile device, and a web service at a server, comprising steps of:
 providing a server comprising a processor, database, provisioning service, store and forward manager, web service, and one or more interface plugins for use by different types of mobile devices;
 providing a mobile device comprising a memory, processor, and software application executing thereon, wherein the mobile device further comprises
  a runtime environment program, which displays software applications provisioned by the provisioning service, wherein the runtime environment program interacts with the server via an interface to receive provisioned applications and asynchronously update application data between the mobile device and the database,
  a software application, which is provided by the provisioning service in a markup language and which is displayable on the mobile device by the runtime environment program, wherein each independent instance of the software application receives a unique incarnation ID, which is used by the runtime environment program to uniquely associate data received from the server with a particular instance of the software application on the mobile device,
  an application data store, residing in the memory of the mobile device, which is used to store
   the application data for use by the software application, and
   templates for use by the runtime environment program in displaying the software application and the application data therein, and
  wherein the application data at the mobile device is persisted locally with the database at the server when a connection between the mobile device and the server is available, including when the software application is either running or not running;
 sending messages, while the software application executes on the mobile device, from the runtime environment program to the server through its interface, in a lower level message transport format associated with that mobile device type, to retrieve, use, or update the application data; and
 receiving the messages at the server, through an interface plugin configured for that mobile device type, and converts the messages received from the runtime environment program into messages that are independent of mobile device type, for subsequent communication to the web service, and provides responses accordingly, including using the store and forward manager to store the responses at the server until the connection between the mobile device and the server is available.

12. The method of claim 11, wherein the mobile device and the server use asynchronous messaging.

13. The method of claim 11, wherein messages are stored until a connection between the mobile device and server is available.

14. The method of claim 11, wherein the application receives data from the web service.

15. The method of claim 11, wherein the messages sent from the mobile device to the server are sent as a block of data in a simplified message format which contains a fragment of a file in the markup language format.

16. The method of claim 11, further comprising supporting a plurality of different types of mobile devices, by providing at the server a transport manager and a different plugin for each mobile device type, which understands the lower level message transport format or protocol used by the type of mobile device.

17. The method of claim 11, wherein the application data for use by the software application, and the templates for use by the runtime environment program in displaying the software application, are stored separately within the mobile device, so that new data can be received from the server without having to generate new markup language for displaying the software application.

18. The method of claim 11, wherein the application data store includes a list of available software applications on the server.

19. The method of claim 11, wherein the software application running within the runtime environment program includes a collection of screens containing user interface information and message handlers which process messages received from the server.

20. The method of claim 11, wherein the software application running within the runtime environment program can operate as multiple independent instances of the same software application, and wherein each multiple independent instance receives a unique incarnation ID, which is used by the runtime environment program to uniquely associate data received from the server with a particular instance (and potentially user) of the software application on the mobile device.

21. A computer readable storage medium, including instructions stored thereon which when executed cause a computer to perform steps comprising:
 providing a server comprising a processor, database, provisioning service, store and forward manager, web service, and one or more interface plugins for use by different types of mobile devices;

receiving messages at the server, from a mobile device comprising a memory, processor, and software application executing thereon, in a lower level message transport format associated with that mobile device type, to retrieve, use, or update application data wherein the mobile device further comprises a runtime environment program, which displays software applications provisioned by the provisioning service, wherein the runtime environment program interacts with the server via an interface to receive provisioned applications and asynchronously update application data between the mobile device and the database, a software application, which is provided by the provisioning service in a markup language and which is displayable on the mobile device by the runtime environment program, wherein each independent instance of the software application receives a unique incarnation ID, which is used by the runtime environment program to uniquely associate data received from the server with a particular instance of the software application on the mobile device, an application data store, residing in the memory of the mobile device, which is used to store the application data for use by the software application, and templates for use by the runtime environment program in displaying the software application and the application data therein, and wherein the application data at the mobile device is persisted locally with the database at the server when a connection between the mobile device and the server is available, including when the software application is either running or not running; and convening the messages received from the runtime environment program through an interface plugin configured for that mobile device type, into messages that are independent of mobile device type, for subsequent communication to the web service, and providing responses accordingly, including using the store and forward manager to store the responses at the server until the connection between the mobile device and the server is available.

22. The computer readable storage medium of claim 21, wherein the mobile device and the sever use asynchronous messaging.

23. The computer readable storage medium of claim 21, wherein messages are stored until a connection between the mobile device and server is available.

24. The computer readable storage medium of claim 21, wherein the application receives data from the web service.

25. The computer readable medium of claim 21, wherein the messages sent from the mobile device to the server are sent as a block of data in a simplified message format which contains a fragment of a file in the markup language format.

\* \* \* \* \*

UNITED STATES PATENT AND TRADEMARK OFFICE
CERTIFICATE OF CORRECTION

PATENT NO. : 7,665,094 B2  Page 1 of 3
APPLICATION NO. : 10/733864
DATED : February 16, 2010
INVENTOR(S) : Kevin Blair Frender et al.

It is certified that error appears in the above-identified patent and that said Letters Patent is hereby corrected as shown below:

Title Page, (*) Notice: delete "736 days" and insert -- 1143 days --.

On sheet 4 of 6, in Figure 4B, line 5, delete "disput:60" and insert -- dispute:60 --, therefor.

On sheet 6 of 6, in Figure 4D, line 14, delete "<ammount" and insert -- <amount --, therefor.

On sheet 6 of 6, in Figure 4D, line 21, delete "<ammount" and insert -- <amount --, therefor.

On sheet 6 of 6, in Figure 4D, line 27, delete "<ammount" and insert -- <amount --, therefor.

On sheet 6 of 6, in Figure 4D, line 34, delete "<ammount" and insert -- <amount --, therefor.

In column 1, line 2, after "SYSTEMS AND METHODS FOR MOBILE COMMUNICATION" insert -- This application claims priority to the following U.S. Provisional Patent Applications: U.S. Provisional Patent Application No. 60/433,543, entitled "Systems and Methods for Mobile Communications", by Krishnan Sastry, filed December 13, 2002. --.

In column 3, line 29, after "include" delete "a".

In column 8, line 50, delete "my" and insert -- may --, therefor.

In column 9, line 32, delete "customizedable" and insert -- customizable --, therefor.

In column 9, line 58, delete "airlet" and insert -- airlet. --, therefor.

In column 12, line 22, delete "everion" and insert -- version --, therefor.

In column 16, line 9, delete "enquereing" and insert -- enqueuing --, therefor.

In column 15-16, in Table, line 21, delete "URI" and insert -- URI. --, therefor.

Signed and Sealed this

Fourteenth Day of September, 2010

David J. Kappos
*Director of the United States Patent and Trademark Office*

CERTIFICATE OF CORRECTION (continued)
U.S. Pat. No. 7,665,094 B2

In column 15-16, in Table, line 27, delete "Acton" and insert -- Action --, therefor.

In column 17, line 10, delete "Relays"" and insert -- Relays". --, therefor.

In column 18, line 13, delete "(II)" and insert -- (IRI) --, therefor.

In column 19, line 39, delete "sMec" and insert -- spec --, therefor.

In column 22, line 4, delete "refereshScreen" and insert -- refreshScreen --, therefor.

In column 23-24, in Table, line 1, delete "Form DTD" and insert the same on cols. 23-24, line 2, below "User Interface Markup".

In column 23-24, in Table, line 10, delete "scronym" and insert -- acronym --, therefor.

In column 23-24, in Table, line 11, delete "lable" and insert -- label --, therefor.

In column 23-24, in Table, line 32-33, delete "%misc.inlin e;)*">" and insert -- %misc.inline;)*"> --, therefor.

In column 25-26, in Table, line 1, delete "Form DTD" and insert the same on cols. 25-26, line 2, below "User Interface Markup".

In column 25-26, in Table, line 29, delete "acroynym" and insert -- acronym --, therefor.

In column 25-26, in Table, line 43, delete "addresss" and insert -- address --, therefor.

In column 25-26, in Table, line 55, delete "<!ATTLITS" and insert -- <!ATTLIST --, therefor.

In column 27-28, in Table, line 8, delete "h5" and insert -- h6 --, therefor.

In column 27-28, in Table, line 18, delete "lable" and insert -- label --, therefor.

In column 27-28, in Table, line 44, delete "ommand-- >" and insert -- command-- > --, therefor.

In column 27-28, in Table, line 45, delete "commandc" and insert -- command --, therefor.

In column 27, line 55, delete "<activateion" and insert -- <activation --, therefor.

In column 27, line 59, delete "<screem" and insert -- <screen --, therefor.

In column 27, line 59, delete "lable" and insert -- label --, therefor.

In column 27, line 60-61, delete "stat sorte" and insert -- data store --, therefor.

In column 29, line 6, delete "Descripton" and insert -- Description --, therefor.

In column 29, line 19, delete "(payBil)'" and insert -- (payBill)' --, therefor.

CERTIFICATE OF CORRECTION (continued)
U.S. Pat. No. 7,665,094 B2

In column 29, line 35, delete "datastor.bill." and insert -- datastore.bill. --, therefor.

In column 29, line 40, delete "timestame" and insert -- timestamp --, therefor.

In column 30, line 12, delete "c urrently" and insert -- currently --, therefor.

In column 30, line 29-30, delete "activation" and insert -- activation. --, therefor.

In column 31, line 57, delete "Bank" and insert -- Bank. --, therefor.

In column 32, line 22, delete "startCoversation" and insert -- startConversation --, therefor.

In column 32, line 24, delete "finishCoversation" and insert -- finishConversation --, therefor.

In column 32, line 40, delete "conversation" and insert -- conversation. --, therefor.

In column 33, line 2-3, delete "onConversationFnished" and insert -- onConversationFinished --, therefor.

In column 33, line 7, delete "CoinversationFinished" and insert -- ConversationFinished --, therefor.

In column 33-34, in Table, line 18, delete "basecalss.startConversation" and insert -- baseclass.startConversation --, therefor.

In column 33-34, in Table, line 29, delete "finishConversaton" and insert -- finishConversation --, therefor.

In column 40, line 6, in claim 21, delete "convening" and insert -- converting --, therefor.

In column 40, line 24, in claim 25, after "readable" insert -- storage --.